United States Patent
Jang et al.

(10) Patent No.: US 9,596,616 B2
(45) Date of Patent: Mar. 14, 2017

(54) ENHANCEMENT ON RADIO LINK FAILURE REPORT TO RECORD NECESSARY TIMING DETAILS FOR A DUAL-THRESHOLD HANDOVER TRIGGER EVENT

(71) Applicant: TELEFONAKTIEBOLAGET L M ERICSSON (PUBL), Stockholm (SE)

(72) Inventors: Ke-Chi Jang, Plano, TX (US); Angelo Centonza, Winchester (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 144 days.

(21) Appl. No.: 14/499,799

(22) Filed: Sep. 29, 2014

(65) Prior Publication Data

US 2015/0092746 A1 Apr. 2, 2015

Related U.S. Application Data

(60) Provisional application No. 61/884,552, filed on Sep. 30, 2013.

(51) Int. Cl.
| | |
|---|---|
| *H04W 4/00* | (2009.01) |
| *H04W 24/08* | (2009.01) |
| *H04W 36/00* | (2009.01) |

(52) U.S. Cl.
CPC .......... *H04W 24/08* (2013.01); *H04W 36/00* (2013.01); *H04W 36/0094* (2013.01)

(58) Field of Classification Search
CPC .. H04W 24/08; H04W 36/00; H04W 36/0094
See application file for complete search history.

(56) References Cited

U.S. PATENT DOCUMENTS

| | | | |
|---|---|---|---|
| 2012/0188907 A1* | 7/2012 | Dayal ............... | H04W 72/1215 370/254 |
| 2013/0115949 A1* | 5/2013 | Centonza ............ | H04W 36/245 455/436 |

(Continued)

FOREIGN PATENT DOCUMENTS

WO    WO 2013/010565 A1    1/2013

OTHER PUBLICATIONS

Huawei et al. Extension to Radio Link Failure reporting for MDT and MRO. 3GPP Draft; R2-110101 Extension TO Radio Link Failure Reporting for MDT and MRO, 3rd Generation Partnership Project (3GPP), Mobile Competence Centre ; 650, Route des Lucioles; F-06921 Sophia-Antipolis Cedex; France, vol. RAN WG2, No. Dublin, Ireland; Jan. 17, 2011, Jan. 10, 2011.

(Continued)

*Primary Examiner* — Ayaz Sheikh
*Assistant Examiner* — Hai-Chang Hsiung

(57) ABSTRACT

A system and method in which a Radio Link Failure, RLF, report from a User Equipment, UE, provides system time-based timestamps to enable a source node to correctly analyze the real cause of an RLF associated with a handover. The timestamps are provided for the latest fulfillment of each event-specific entering condition associated with a handover-triggering event and for the occurrence of the RLF. The recorded timestamps are sent as part of RLF-reporting information to be forwarded to the source node to assist the source node in adjusting event-specific threshold(s) as well as other non-threshold related handover parameters such as the Time To Trigger, TTT, period, the time delay between a UE's transmission of its Measurement Report and the source node's transmission of the handover command, and the like, to reduce similar RLFs in the future.

(Continued)

The generation of timestamps does not waste the UE's processing resources or battery power.

16 Claims, 4 Drawing Sheets

(56) References Cited

U.S. PATENT DOCUMENTS

2013/0331105 A1* 12/2013 Olofsson ........... H04W 36/0005
                                                       455/438
2014/0370914 A1* 12/2014 Jung .................... H04W 24/10
                                                       455/456.1

OTHER PUBLICATIONS

ZTE. MDT Support for the RLF Report. 3GPP Draft; R2-113818 MDT Support for the RLF Report, $3^{rd}$ Generation Partnership Project (3GPP), Mobile Competence Centre ; 650, Route des Lucioles; F-06921 Sophia-Antipolis Cedex; France, vol. RAN WG2, No. Athens, Greece; Aug. 22, 2011, Aug. 17, 2011.

NSN. Timer Based Approach for Detection of Misconfigured Threshold of a Dual Threshold Event. 3GPP TSG RAN WG3 Meeting #81, R3-131318. Barcelona, Spain, Aug. 19-23, 2013.

* cited by examiner

ENHANCEMENT ON RADIO LINK FAILURE REPORT TO RECORD NECESSARY TIMING DETAILS FOR A DUAL-THRESHOLD HANDOVER TRIGGER EVENT

CROSS-REFERENCE TO RELATED APPLICATIONS

This application claims the priority benefit under 35 U.S.C. §119(e) of U.S. Provisional Application No. 61/884,552 filed on Sep. 30, 2013, the disclosure of which is incorporated herein by reference in its entirety.

TECHNICAL FIELD

The present disclosure relates to a Radio Link Failure (RLF) condition in a mobile communication network. More particularly, and not by way of limitation, particular embodiments of the present disclosure are directed to a system and method of enhancing an RLF report related to an RLF associated with a handover (HO), wherein the enhanced RLF report includes additional timing details of an HO-triggering event based on the common system time to enable a source cell to better identify the root cause of the RLF and to thereby provide a better resolution to address the RLF.

BACKGROUND

In cellular communication, the most basic form of "handover" or "handoff" is when a phone call or other communication session in progress is redirected from its current cell, which is called a "source cell" or "serving cell", to a new cell (called "target cell"). In terrestrial cellular radio networks, the source and the target cells may be served from two different cell sites or from a single cell site. In the latter case, the two cells are usually referred to as two "sectors" on the cell site. Such a handover (HO), in which the source and the target cells are different cells—even if they are on the same cell site—is called an inter-cell handover. The purpose of an inter-cell handover is to maintain the call or other currently ongoing service session as the subscriber is moving out of the area covered by the source cell and entering the area of the target cell.

In the discussion herein, a "cell" and its associated base station such as, for example, an evolved Node B (eNB or eNodeB) may be referred to in an interchangeable manner. For example, a User Equipment (UE) may be interchangeably referred to as being handed over to a target cell or a target eNB, or an HO may be interchangeably referred to as being initiated by a source cell or a source eNB, and so on.

In the context of the handover related discussion herein, it is understood that a UE may be physically present and operating (or registered) within its serving cell or may be currently associated with—i.e., under Radio Frequency (RF) coverage of—or attached to the serving cell in some manner such as, for example, through a prior handover. The UE may now need to be handed over to a target cell if so determined by the serving eNB associated with the UE's source cell and providing RF coverage to the UE within the source cell. A target eNB may provide RF coverage over the target cell and in its vicinity.

As is known, when a UE is mobile, it may start receiving RF signals from a Radio Base Station (RBS, or more simply "BS") or eNB in a neighboring cell along with the RF signals from its serving cell, especially when the UE is in the vicinity of the neighboring cell. The terms "neighboring cell" and "target cell" are used interchangeably herein to refer to a potential candidate cell considered by the UE's serving cell for the HO of the UE. The HO may be required, for example, when the UE is mobile and the strength of the signals received from the UE's source eNB may no longer satisfy a predefined threshold for sustained attachment of the UE to its source eNB, whereas the strength of the signals received from one or more of the neighboring base stations may be more favorable for sustaining the UE's current service session in the network. In that regard, the neighboring base stations may qualify as "potential target" base stations that the source eNB may consider for the HO of the UE. However, the source eNB first may need to be made aware of these potential target eNBs before it can decide whether to initiate the HO and to which cell. Hence, the source/serving eNB may instruct the UE attached to the serving cell and under operative control of the source eNB to perform certain measurements on the potential target cells. The source eNB may use different policies for triggering the UE to do the measurements and when to report them to the source eNB.

In a Third Generation Partnership Project's (3GPP) Long Term Evolution (LTE) cellular network, when a UE receives RF signals from a potential target cell, the UE may report that target cell's signal measurements, as received by the UE, to the UE's serving cell using a Radio Resource Control (RRC) Measurement Report. The UE's Measurement Report may identify one or more candidate eNBs for handover. The UE may perform measurements on the neighbor cells by measuring their Reference Symbols Received Power (RSRP), Reference Symbols Received Quality (RSRQ), and so on. Based on the Measurement Report received from the UE, the source eNB may make a decision whether to handover the UE to a target eNB or not.

There are multiple HO-triggering or Measurement Report-triggering "events" defined for an Evolved Universal Terrestrial Radio Access Network (E-UTRAN) portion of an LTE cellular network. When the criteria or conditions defined for an "event" are satisfied, the UE will generate and send a Measurement Report to its source eNB to assist the source eNB in HO-related decision-making. Currently, there are eight different "events" defined for E-UTRAN in section 5.5.4 of the 3GPP Technical Specification (TS) 36.331, version 12.2.0 (June 2014), titled "$3^{rd}$ Generation Partnership Project; Technical Specification Group Radio Access Network; Evolved Universal Terrestrial Radio Access (E-UTRA); Radio Resource Control (RRC); Protocol specification (Release 12)." The discussion in the section 5.5.4 of the 3GPP TS 36.331 is incorporated herein by reference in its entirety. Each of these eight "events" has different triggering condition. The discussion herein primarily focuses on the Event A5, which refers to a situation when the signals received by a UE from its serving cell become worse than a first predefined threshold, whereas the signals from a neighbor/target cell become better than a second predefined threshold. Thus, Event A5 is a dual-threshold HO-triggering event. However, as discussed later below, the teachings of the present disclosure are applicable to other triggering "events" as well—dual-threshold or single-threshold.

It is noted here that, for ease of discussion, the terms "HO-triggering event," "Measurement Report-triggering event," and "trigger event" are used interchangeably herein to refer to an "event" associated with a network defined signal-quality threshold that triggers a UE to generate a Measurement Report. It is recognized that the UE will also generate periodic measurement reports whenever a defined periodic reporting timer expires and a parameter for a configured report amount is met, but this is not considered an "event" in the present disclosure since no signal-quality threshold is involved. It is further recognized that, strictly speaking, fulfillment of the criteria for such an "event," by itself, may not necessarily result in triggering of an HO unless certain other conditions are fulfilled as well. Thus, although the terms "HO-triggering event" and "Measurement Report-triggering event" are related, they are not exactly the same. However, for ease of discussion, these terms are sometimes used interchangeably in the relevant literature and, hence, such traditional usage is maintained in the present discussion as well.

FIG. 1 shows an exemplary timeline 10 associated with an HO procedure based on the fulfillment of certain criteria defined for the Event A5. As mentioned earlier, LTE defines multiple HO- or Measurement Report-triggering mechanisms that can be used by a source eNB to trigger a UE to send a measurement report and potentially also trigger an HO procedure for the UE. As noted above, the Event A5 is based on two different thresholds—(i) the first threshold "A5-1" referring to a situation when the Primary Cell's (PCell) signal strength becomes worse than a pre-defined Threshold 1, and (ii) the second threshold "A5-2" referring to a situation when a neighbor cell's signal strength becomes better than a pre-defined Threshold 2. Two exemplary A5-1 and A5-2 thresholds are indicated by reference numerals "12" and "14", respectively, in FIG. 1. It is noted here that the term "source cell" generally refers to a PCell when there is no Carrier Aggregation (CA) present. However, as discussed in the earlier-mentioned 3GPP TS 36.331, when CA is present, the term "source cell" may include multiple serving cells—one PCell and one or more Secondary Cells (SCells). In any event, for ease of discussion, only the non-CA scenario is assumed in the discussion below. Thus, a "source cell" is treated as the PCell, without any discussion of SCells.

The A5-1 and A5-2 thresholds define "entering conditions" specific for the Event A5. Other "events"—such as Event A3, Event B2, and so on—may have their own event-specific entering condition(s) as discussed later below. When an event-specific "entering condition" is fulfilled, the UE may enter the measurement report triggering phase.

In the discussion herein and in the relevant literature, the term "Ms" is generally used to refer to the UE's measurement result of the source/serving cell, not taking into account any offsets defined for the given "event" in the above-mentioned section 5.5.4 of the 3GPP TS 36.331. Similarly, the term "Mn" is generally used to refer to the UE's measurement result of the neighboring cell, not taking into account any offsets. In FIG. 1, and also in FIGS. 2-3 and 6, the RSRP signal strength plot for Mn is shown as an unbroken line 16, whereas the RSRP signal strength plot for Ms is shown as a broken line 18 having the pattern "-•-•-".

It is seen from FIG. 1 that the A5-2 "entering condition" is met first, at the timing instance 20 as noted at text block 21. On the other hand, the A5-1 "entering condition" is met later, at the timing instance 22. When the A5-1 condition is met at instance 22, the event-specific "entering conditions" for the Event A5 can be considered to have been met because, as noted at text block 23 and as can be seen from the plots 16, 18 in FIG. 1, both of the A5-1 and A5-2 conditions are met at the timing instance 22. If the Event A5 "entering conditions" can be maintained for a period of time, defined as a Time To Trigger (TTT), the UE will generate a Measurement Report during this TTT period and send the report to its source eNB. An exemplary TTT time interval 25 is shown in FIG. 1 and pointed out by the text block 26. The TTT period 25 is generally configured by the network such as, for example, by the source eNB, with the purpose of making sure that the target cell signal strength can be maintained at an acceptable level—here, above the A5 Threshold-2 or A5-2—before handover occurs.

Based on the Measurement Report, the source eNB may make a decision, using certain parameters not relevant here, whether to handover the UE to the neighbor/target cell reported in the UE's Measurement Report and associated with the signal Mn 16. Upon determining that the UE is to be handed over to the reported target cell, the source eNB may initiate an HO procedure for the UE by sending an HO command to the UE and instruct the UE to perform handover to the neighbor cell associated with the signal Mn 16. In FIG. 1, the timeline 28 indicates receipt of the HO command by the UE as noted at text block 29. After a brief HO interruption period 30, the UE may connect to the target/neighbor cell, which is indicated by the reference numeral "32" in FIG. 1.

However, if the UE fails to complete the HO during the HO interruption period 30, Radio Link Failure (RLF) is considered to have occurred. RLF may occur due to different trigger points such as, for example: (i) When a UE reaches a maximum number of retransmissions allowed to connect to a cell such as, for example, a serving cell; or (ii) When the UE-based T310 timer expires. The T310 timer may be started upon receiving N310 consecutive out-of-sync indications for the UE's source/serving cell from the lower layer; or (iii) When a UE receives random access problem indication from the Medium Access Control (MAC) layer; or (iv) When a UE encounters a handover failure. Additional discussion of factors that can trigger a UE to report an RLF condition may be obtained, for example, from section 5.3.11.3 in the earlier-mentioned 3GPP TS 36.331.

The present disclosure relates to RLF associated with a handover. RLF due to HO process is considered a mobility failure. There are several types of mobility failure cases defined, for example, in section 22.4.2 in the 3GPP TS 36.300, version 12.2.0 (June 2014), titled "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)." The discussion in section 22.4.2 of the 3GPP TS 36.300 is incorporated herein by reference in its entirety. These mobility failure cases are: (1) "Too late handover" case: Here, the RLF occurs in the source cell before handover was initiated or completed. The RLF occurs after the UE has stayed for a long period of time in the source cell. In this case, after RLF, the UE attempts to re-establish radio link connection with another cell. (2) "Too early handover" case: Here, the RLF occurs in the target cell shortly after a successful HO from the source cell to the target cell or a handover failure occurs during the HO procedure. In this case, after RLF, the UE attempts to re-establish radio link connection with the source cell. (3) "Handover to wrong cell" case: Here, the RLF occurs in the target cell after completion of the HO procedure. However, after RLF, the UE attempts to re-establish radio link connection with another cell which is neither the target cell nor the source cell.

An RLF may be considered "associated with" or occurring "during" an HO procedure when the RLF occurs shortly prior to, during, or shortly after the HO from a source cell to a target cell. After an RLF during the HO procedure, the UE may attempt to reconnect to the network. After its reconnection to the network, the UE may send an RLF Report to the reconnected cell, which, for ease of discussion herein, is represented by the term "target cell". The UE may include its RLF Report in a UEInformationResponse message to the target cell as discussed in more detail in sections 5.6.5 and 6.2.2 in the earlier-mentioned 3GPP TS 36.331. The discussion in these sections is incorporated herein by reference in its entirety. The target eNB may then forward the UE's RLF report to the source eNB, which was serving the UE immediately prior to the occurrence of the RLF, via a Radio Link Failure Indication message as discussed in more detail, for example, in section 8.3.9 of 3GPP TS 36.423, version 12.2.0 (June 2014), titled "3$^{rd}$ Generation Partnership Project; Technical Specification Group Radio Access Network; Evolved Universal Terrestrial Radio Access Network (E-UTRAN); X2 application protocol (X2AP) (Release 12)."

The UE may include one or more of the following information in its RLF Report so as to assist the source cell in adjusting its HO-related parameters with the hope to reduce RLF due to handover: (i) RSRP/RSRQ measurement result (signal strength/quality) from the last serving cell and, optionally, the RSRP/RSRQ measurement result from neighbor cells, which can be from different Radio Access Technologies (RATs); (ii) Cell ID of the failed PCell or source cell; (iii) Cell ID of the re-connected cell; (iv) Geographical location information of the UE when the RLF occurred; and (v) the Time Connection Failure (TCF) period identifying the time interval between the actual starting of the HO procedure and the occurrence of the RLF. For example, the TCF period may be 50 seconds. In other words, a TCF interval represents the time elapsed since the last HO initialization—for example, since the UE's reception of the last HO command including the MobilityControlInfo—until the connection failure or RLF. Additional information that a UE may include in its RLF report to the reconnected/target cell is defined in section 5.3.11.3 of the earlier-mentioned 3GPP TS 36.331, the discussion of that section is incorporated herein by reference in its entirety.

As noted above, when the source cell receives the UE's RLF report, it can try to adjust some of the HO-related parameters—more usually, the event-specific thresholds—with the hope that such adjustment(s) can reduce RLF occurrences. For example, in case of the Event A5, the source cell can try to adjust the threshold values A5-1 and/or A5-2.

SUMMARY

Modern wireless networks are moving in the direction of densification because cellular system deployment has reached practical limits in many urban areas, while data traffic only continues to increase. Hence, to increase area spectral efficiency to accommodate the increasing data traffic, network operators are moving in the direction of Heterogeneous Networks (HetNet). A HetNet may support multiple radio access technologies, architectures, transmission solutions, and base stations of varying transmission power. Heterogeneous networks may consist of planned macro base station deployments that typically transmit at high power overlaid with several low power nodes providing radio coverage over "small cells," which are cells within the larger macro cell. The low power nodes may be deployed to eliminate coverage holes such as, for example, "dead spots" or coverage holes in outdoor and indoor environments such as, for example, a geographical area having a large number of office buildings requiring heavy indoor data traffic, and also to increase the capacity/area of the network. Picocells and femtocells have small base stations that may be operating under the control of the macro base station and installed in dead spots or high traffic areas to increase the network coverage and capacity.

Inter-frequency handover (HO) may be required for some network deployments such as, for example, deployment of a network having macro cells and small cells. The Event A5 (or Event B2 for inter-RAT handover) may be used for an inter-frequency HO for measurement/HO event triggering. As mentioned, a small cell may be deployed within a macro cell and may use a frequency F2, whereas the macro cell may use a frequency F1 for radio coverage. When a UE moves away from the small cell, the Event A5 may be used for Measurement Report- or HO-triggering.

Using the earlier-mentioned "too late HO" case as an example, for the Event A5, RLF related to the "too late HO" case may occur under one of the following conditions:

(1) RLF occurs when both threshold criteria—A5-1 and A5-2—are not met.

(2) RLF occurs when one of the threshold criteria—either A5-1 or A5-2—is not met.

(3) RLF occurs when both threshold criteria—A5-1 and A5-2—are met, but an HO has not been triggered, for example, because the TTT has not expired, or the HO procedure has already started but has not finished yet.

As noted earlier, after reconnecting to the target cell subsequent to an RLF, the UE may send its RLF Report to the target cell and the target cell forwards that report to the source cell that was serving the UE immediately prior to the RLF. Based on the information in the RLF report, the source cell may attempt to adjust the settings of one or more HO parameters to address/improve the HO situation and reduce the chances of future RLFs.

For the RLF conditions (1) and (2) mentioned above, the source cell may be able to make necessary adjustment based on the information included in the RLF report. The source cell can analyze the information such as, for example, the measured signal strength information for both the source cell and the target cell, the geographical location information, and the duration between the HO initialization and the occurrence of the RLF (the TimeConnFailure or Time Connection Failure period), to adjust A5-1 and/or A5-2 threshold parameter values for the Event A5 so that future RLFs can be reduced.

For the RLF condition (3) mentioned above, the source cell may perform a similar analysis based on the received RLF report information. However, unlike the first two conditions, the RLF condition (3) relates to a situation where both A5-1 and A5-2 threshold criteria are met and the UE is either in the process of waiting to generate a Measurement Report during a respective TTT or the HO procedure has just started. As discussed later with reference to FIGS. 2-3, the RLF may occur due to a steep drop of the source cell's signaling strength right after the A5 Threshold-1 (or A5-1) condition is met, where the Threshold-2 (or A5-2) condition was already met before the A5-1 condition is met.

If RLF is related to the conditions (1) or (2) above, the source cell can adjust the impacted threshold level to address the issues. However, there is no such threshold level to "adjust" in the RLF condition (3) because both the threshold criteria are already met. In any event, based on the received information in the UE's RLF report, if the source eNB lowers the Threshold-2 (A5-2) level, that does not address the issue for condition (3) because the target signal strength may be already above the original Threshold-2 level even before the Threshold-1 requirement is met. On the other hand, increasing the A5-2 level may not help sometimes, especially when the target signal may be just a little bit above the current A5-2 level. In that case, the newly-increased level of A5-2 may make it difficult for the target signal to now meet the entering requirement of A5-2. Lowering the current A5-1 level does not address the issue either because there is already a steep drop of the source cell signal strength. Although increasing the current A5-1 level may work, it may however negatively impact the overall loading of the source cell and coverage of the source cell. For example, an increased A5-1 level may trigger more handovers due to an early fulfillment of the "entering conditions" for the Event A5. The TimeConnFailure or TCF timing information in the RLF report does not help either because it does not reflect the fact that the target cell has already met the A5-2 requirement long before the source cell meets its A5-1 requirement for triggering the Event A5.

It is seen from the above paragraph that the currently-configured threshold levels for Event A5 may not be the root cause of the above-mentioned RLF condition (3) for the "too late HO" case. Rather, the root cause may be that the currently-configured TTT is too long such that the Measurement Report cannot be sent out sooner (as discussed below with reference to FIG. 2) or that the source cell's signal drops so quickly that the HO process cannot be completed (as discussed below with reference to FIG. 3). In other words, this RLF condition (3) may require a different adjustment/solution than the mere adjustment of threshold level(s).

Thus, it would be desirable to generate an RLF report that provides relevant timing information to the source cell to enable the source cell to correctly analyze the real cause of an RLF associated with a handover, especially when the event-specific configured threshold level(s) may not be the root cause. Such timing information should assist the source cell to adjust threshold(s) as well as other non-threshold related HO parameters such as, for example, the TTT time period, the time delay between a UE's transmission of its Measurement Report and the source cell's transmission of the HO command, and so on, to reduce similar RLFs in the future. For example, the source cell can use the additional timing information to determine whether changing a threshold level can address the RLF issue or whether there is a need to adjust other timing-related configuration or take some other actions such as, for example, adjust the source eNB's transmit power, tilting the angle of a source eNB antenna for proper signal reception at the location of the UE, and the like.

It is further desirable that such additional timing information be provided in case of other Measurement Report-triggering events where similar issues may arise when the source cell signal strength drops very quickly after the relevant event-specific "entering condition" is met. It is also desirable to generate the timing information at a UE in such a way that there is a minimal impact on UE's processing resources or battery power.

As a solution, particular embodiments of the present disclosure provide a system and method where a UE records the latest timestamp for each event-specific "entering condition." For example, for the HO-triggering Event A5, the UE would record two timestamps—a first timestamp for the latest fulfillment of the A5-1 condition, and a second timestamp for the latest fulfillment of the A5-2 condition. The term "latest" here refers to the most-recent occurrence of an "entering condition" for an HO-triggering event. The UE would also record a timestamp for the timing instance when an RLF occurs. In one embodiment, all of these timestamps can be based on a reference time related to the network and recognized by the source node. Such "reference time" can be a system time, a network-wide common time, a time in the GNSS format, or any other absolute time that is common between the UE and the source cell. In the discussion below, the terms "system time" and "reference time" may be used interchangeably to essentially refer to the timing reference used by the UE to record various timestamps discussed herein.

Upon reconnection to a target node after the RLF, the UE may send the recorded timestamps as part of its RLF-reporting information to the target node. As is known, the target node may then forward this RLF-reporting information to the source node that was serving the UE immediately prior to the occurrence of the RLF. In one embodiment, the "rlf-Report" Information Element (IE) of the currently-defined UEInformationResponse message may be modified to contain the RLF-reporting information as per the teachings of the present disclosure. In another embodiment, when the timestamp-based RLF-reporting information is not contained in the modified rlf-Report IE, the currently-defined format of the UEInformationResponse message may be modified to include the RLF-reporting information elsewhere in the message. As noted earlier, sections 5.6.5 and 6.2.2 in the earlier-mentioned 3GPP TS 36.331 provide the currently-defined format of the UEInformationResponse message. In yet another embodiment, the RLF-reporting information according to the teachings of the present disclosure may be sent using a modified version of some other existing RRC message or using a newly-defined message.

According to particular embodiments of the present disclosure, the analysis of the recorded timestamps may enable the source node to determine one or more of the following: (i) For a dual-threshold event such as, for example, the Event A5, the timing instances when each event-specific "entering condition" is fulfilled with reference to the system time. Similar information may be determined for a single threshold event as well, such as, for example, the Event A3 described later below. (ii) The time duration between the two time instances representing the fulfillment of respective "entering conditions" of the dual-threshold event. (iii) The time instance of the occurrence of the RLF with reference to the system time, and how soon the RLF occurs after both event-specific entering conditions are fulfilled for the dual-threshold event or after the event-specific entering condition is fulfilled for the single-threshold event. (iv) Whether the currently-configured TTT duration is "too long" so that the source cell signal drops too much before TTT expires. (v) Whether the source cell's signal strength drops too fast after a UE sends its measurement report, so that the UE is not able to receive the HO command due to weak signal from the source cell. (vi) Whether the RLF is due to TTT timer length or the UE not being able to receive the HO command after sending its Measurement Report.

In one embodiment, the present disclosure is directed to a method of reporting an occurrence of a Radio Link Failure (RLF) associated with a handover (HO) of a User Equipment (UE) by a source node to a target node. The method comprises performing the following by the UE: (i) for each event-specific entering condition associated with a Measurement-Report-triggering event related to the HO, storing a respective triggering time-stamp for only a most recent fulfillment of each corresponding event-specific entering condition; (ii) storing a failure time-stamp for the occurrence of the RLF; and (iii) sending RLF-reporting information to the target node, wherein the RLF-reporting information contains the stored triggering and failure time-stamps.

In one embodiment, the triggering and the failure time-stamps are based on a reference time recognized by the source node. In particular embodiments, the reference time may be one of the following: (i) a system time of the source node; (ii) an absolute time used within a source cell associated with the source node; (iii) a network-wide common time available throughout a carrier network associated with the source node; and (iv) a time in a Global Navigation Satellite System (GNSS) format.

In another embodiment, there may be a plurality of fulfillments of one or more event-specific entering conditions associated with the Measurement Report-triggering event. In that case, the method may include performing the following by the UE: (i) generating a corresponding time-stamp for each respective fulfillment in the plurality of fulfillments; and (ii) during this generating operation, overwriting each time-wise preceding time-stamp to thereby retain a triggering time-stamp for only the most recent fulfillment.

In one embodiment, the UE may send the Measurement Report to the source node prior to the occurrence of the RLF. In another embodiment, the UE may send the RLF-reporting information to the target node without receiving an HO command from the source node. In a further embodiment, the UE may send the RLF-reporting information to the target node after receiving an HO command from the source node.

In one embodiment, the RLF-reporting information may contain the signal strength of the source node when the RLF occurs.

In a further embodiment, the present disclosure is directed to a mobile device for reporting the occurrence of an RLF associated with an HO of the mobile device by a source node to a target node, wherein the source node serves the mobile device in a cellular network. The mobile device comprises: (a) a transceiver for wirelessly communicating with the source node in the cellular network; (b) a memory for storing program instructions; and (c) a processor coupled to the memory and the transceiver and configured to execute the program instructions. Upon execution of the program instructions, the mobile device is operative to store the following in the memory for each event-specific entering condition associated with a Measurement Report-triggering event related to the HO: (i) a respective timing indication for only a most recent fulfillment of each corresponding event-specific entering condition; and (ii) a failure time-stamp for the occurrence of the RLF, wherein each of the respective timing indication and the failure time-stamp is based on a reference time recognized by the source node. Upon execution of the program instructions, the mobile device is further operative to send RLF-reporting information to the target node, wherein the RLF-reporting information contains each stored timing indication and the stored failure time-stamp.

In one embodiment, the mobile device is operative to store, in the memory, a respective triggering time-stamp for only the most recent fulfillment of each corresponding event-specific entering condition associated with the Measurement Report-triggering event. The triggering time-stamp may be based on the reference time recognized by the source node.

In another embodiment, the mobile device is operative to: (i) store, in the memory, a triggering time-stamp for only the most recent fulfillment of a first one of the plurality of event-specific entering conditions, wherein the triggering time-stamp is based on the reference time recognized by the source node; and (ii) store, in the memory, a respective time duration value for only the most recent fulfillment of each remaining event-specific entering condition in the plurality of event-specific entering conditions, wherein the respective time duration value is measured with reference to the triggering time-stamp.

In a still further embodiment, the present disclosure is directed to a network entity in a cellular network for performing an HO of a mobile device to a target entity, wherein an RLF is associated with the HO and wherein the network entity was serving the mobile device immediately prior to the RLF. The network entity comprises: (a) a transceiver for wirelessly communicating with the mobile device; (b) a memory for storing program instructions; and (c) a processor coupled to the memory and the transceiver and configured to execute the program instructions. Upon execution of the program instructions, the network entity is operative to perform the following: (i) receive RLF-reporting information from the target entity, wherein the RLF-reporting information contains the following: (A) a respective triggering time-stamp for only a most recent fulfillment of each corresponding event-specific entering condition associated with a Measurement Report-triggering event related to the HO, and (B) a failure time-stamp for the occurrence of the RLF, wherein each of the triggering and the failure time-stamps is based on a reference time recognized by the network entity; and (ii) process the received RLF-reporting information.

In one embodiment, the network entity may be one of the following: (i) a Radio Base Station (RBS); (ii) a Base Station Controller (BSC); (iii) a Radio Network Controller (RNC); and (iv) an evolved Node B (eNodeB).

The system time-based timestamp information in an RLF report according to particular embodiments of the present disclosure provides the source cell with a better picture of why RLF happens and, hence, enables the source cell to provide a better resolution of the RLF issue instead of unnecessarily, and probably incorrectly, adjusting the event-specific threshold level(s) for an HO-triggering event. The present disclosure not only helps preventing the unnecessary wastage of processing resources at a UE, but also allows an exact recollection of when mobility failure-related actions occurred at the UE. The additional timing information according to particular embodiments of the present disclosure enables the source cell to not limit its resolution of the RLF issue to adjustment of threshold level(s), but to also explore the adjustment of a TTT interval or other cell coverage related parameters depending on the true root cause of the RLF associated with the HO.

BRIEF DESCRIPTION OF THE DRAWINGS

In the following section, the present disclosure will be described with reference to exemplary embodiments illustrated in the figures, in which.

DETAILED DESCRIPTION

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure. It should be understood that the disclosure is described primarily in the context of a Third Generation Partnership Project (3GPP) cellular telephone/data network such as, for example, an LTE network, but it can be implemented in other forms of cellular or non-cellular wireless networks as well. Thus, the use of the term "cell"— as in the "serving cell," "source cell," "neighbor cell," or the "target cell"—in the discussion below should not be construed to be limited to a cellular structure only.

Figure 1:
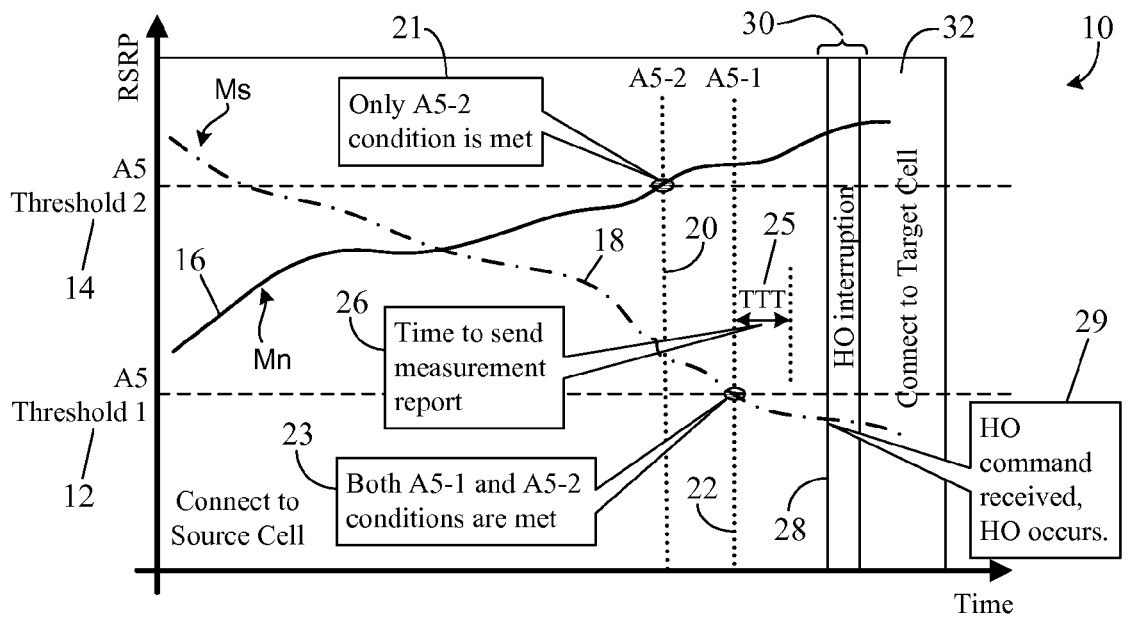
FIG. 1 shows an exemplary timeline associated with an HO procedure based on the fulfillment of certain criteria defined for the Event A5.
Figure 2:
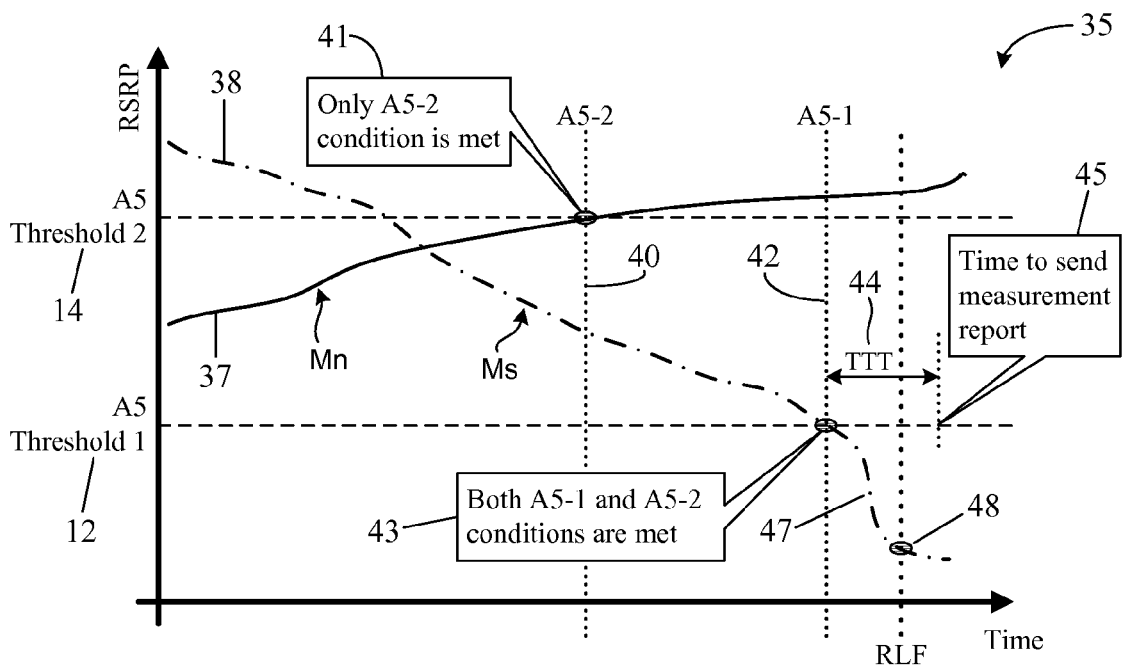
FIG. 2 is an exemplary plot depicting a "too late HO" scenario where the TTT period is too long.

FIG. 2 is an exemplary plot 35 depicting a "too late HO" scenario where the TTT period is too long. The A5-1 and A5-2 thresholds are indicated in FIG. 2 using the same reference numerals 12 and 14, respectively, as in FIG. 1. However, in FIG. 2, two new exemplary RSRP signal strength plots 37-38 for Mn and Ms, respectively, are shown. The A5-2 "entering condition" is met first, at the timing instance 40 as noted at text block 41. The A5-1 "entering condition" is met later, at the timing instance 42. The text block 43 indicates that both event-specific "entering conditions" for the Event A5 are met when the A5-1 condition is met at the instance 42. In FIG. 2, an exemplary TTT time interval 44 is shown and its associated block 45 points out that the UE may send its Measurement Report at the conclusion of this defined TTT period. Like the TTT period 25 in FIG. 1, the TTT period 44 also may be configured by the source eNB. It is seen from FIG. 2 that there is a steep drop in the signaling strength of Ms immediately after the A5-1 condition is met. This sharp signal drop is indicated by reference numeral "47." Such signal drop may be caused when, for example, the source cell's signals are blocked by a building. The sharp signal drop 47 of signals from the source eNB may cause the UE to experience an RLF. The timing instance of the occurrence of this RLF is indicated by the reference numeral "48." It is seen from FIG. 2 that even though both of the entering conditions A5-1 and A5-2 were met at the timing instance 42 and thereafter, the HO could not be initiated because the TTT period 44 is "too long" in the sense that the source cell's signal drops (and, hence, RLF occurs) during the TTT. Thus, the UE could not send its Measurement Report before the unexpected RLF.

Figure 3:
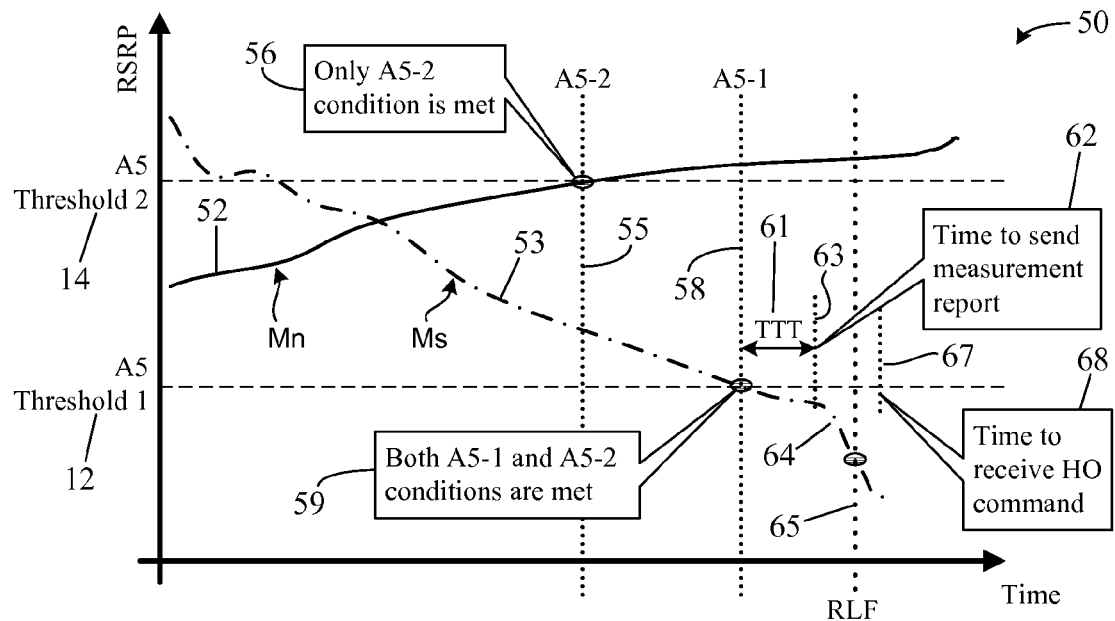
FIG. 3 shows an exemplary plot illustrating a "too late HO" scenario where the source cell's signal drops too quickly after the TTT period such that the HO process cannot be completed.

FIG. 3 shows an exemplary plot 50 illustrating a "too late HO" scenario where the source cell's signal drops too quickly after the TTT period such that the HO process cannot be completed. Again, the A5-1 and A5-2 thresholds are indicated in FIG. 3 using the same reference numerals 12 and 14, respectively, as in FIG. 1. However, in FIG. 3, two new exemplary RSRP signal strength plots 52-53 for Mn and Ms, respectively, are shown. The A5-2 "entering condition" is met first, at the timing instance 55 as noted at text block 56. The A5-1 "entering condition" is met later, at the timing instance 58. The text block 59 indicates that both event-specific "entering conditions" for the Event A5 are met when the A5-1 condition is met at the instance 58. In FIG. 3, an exemplary TTT time interval 61 is shown and its associated block 62 points out that the UE sends its Measurement Report at the conclusion of this defined TTT period—here, at the timing instance 63. Like the TTT period 25 in FIG. 1, the TTT period 61 also may be configured by the source eNB. It is seen from FIG. 3 that there is a steep drop in the signaling strength of Ms almost immediately after the TTT period 61 is over, but before an HO command can be received by the UE from its source eNB. This sharp signal drop is indicated by reference numeral "64." As mentioned earlier, such signal drop may be caused when, for example, the source cell's signals are blocked by a building. The sharp signal drop 64 of signals from the source eNB may cause the UE to experience an RLF. The timing instance of the occurrence of this RLF is indicated by the reference numeral "65." Had the Ms signal not dropped so sharply as to cause the RLF, the UE may have received the HO command at the time instance 67, as noted at the text block 68. It is seen from FIG. 3 that even though both of the entering conditions A5-1 and A5-2 were met at the timing instance 58 and thereafter, and even though a Measurement Report was sent from the UE, the HO process still could not be completed because the source cell's signal drop is too quick after the TTT period 61. Thus, although the HO process may be considered to have "just started" (when the UE sent its Measurement Report), the UE could not receive an HO command in time for the HO to complete successfully.

As mentioned earlier, in the RLF condition (3) for the "too late HO" case for Event A5, both threshold criteria—A5-1 and A5-2—are met, but an HO has not been triggered, for example, because the TTT has not expired, or the HO procedure has already started but has not finished yet. This may require a different adjustment/solution than the mere adjustment of threshold level(s) because the configured threshold levels may not be the root cause of the problem associated with the RLF condition (3). For other HO-triggering events such as, for example, Event A3, Event A6, Event B2, and so on, similar issues may arise when the source cell signal strength drops very quickly after the relevant event-specific "entering condition" is met.

Using the Event A5 as an example, it is observed that, currently, a UE-sent RLF report does not include enough information to enable the source cell to detect and analyze the root cause of the RLF condition (3). Existing RLF reporting requirements result in RLF reports that do not include necessary timing information that allows the source cell to determine whether the RLF happens during the TTT period or after the TTT period. Similar problems arise when the source eNB attempts to analyze RLF reports for other HO-triggering events.

The 3GPP Technical Specification Group (TSG) Radio Access Network (RAN) Working Group 3 (WG3) Meeting #81, R3-131318 document, titled "Timer based approach for detection of misconfigured threshold of a dual threshold event," NSN, Barcelona, Spain, Aug. 19-23, 2013 (hereafter, "the NSN document"), recognizes the above-discussed RLF condition (3) for the "too late HO" case associated with the Event A5. However, the NSN document focuses on detection of a misconfigured threshold and proposes a timer-based approach to enable the source eNB to properly detect the misconfigured threshold. The solution proposed is to start a timer at the UE side to record the duration between each threshold-entering point and the RLF occurrence time. Thus, in case of the Event A5, the UE starts one timer when the Ms measurement crosses the A5-1 threshold and stops that timer when the RLF occurs, and the UE also starts a second timer when the Mn measurement crosses the A5-2 threshold and stops that second timer when the RLF occurs. Those time intervals are then reported in the RLF report. For example, the UE in the NSN document would record two timer durations: (i) a first timer duration "D1" for the duration between the fulfillment of the A5-1 entering condition and the instance when RLF occurs, and (ii) a second timer duration "D2" representing the time interval between the fulfillment of the A5-2 entering condition and the RLF occurrence. Assuming that the A5-2 threshold is met before the A5-1 threshold, then D2>D1 and Td=D2−D1 (which is the time duration difference between these two timer values).

It is known that a "timer" simply represents a duration—a timer either counts down to expiration or counts up to indicate a "period." A timer has no association with and does not represent any specific reference source of time such as, for example, a system time, a network-wide common time, a time in the Global Navigation Satellite System (GNSS) format, or any other absolute time. Thus, for the NSN document, the above-mentioned "Td" value may show to a source eNB how early the A5-2 threshold is met before the A5-1 threshold is met. However, the source eNB or carrier network would not know when exactly these entering conditions occur because, as noted above, a time duration reported by a timer is not associated with or linked to a common source of time that can be recognized by the source eNB or carrier network. Therefore, the time duration information reported by a UE in the NSN document would be of no use to an Operations, Administration and Management (OAM) system of the network operator if it is needed to record the failing event in the OAM to figure out when exactly the failure occurred. The timer-based proposal in the NSN document may be considered similar to the existing Time Connection Failure (TCF) period information discussed earlier because both of these approaches just provide time duration information; there is no reference to a common system time or other absolute time in either of these approaches.

Under the earlier assumption that the A5-2 threshold is met before the A5-1 threshold, the duration "D1" in the NSN document may be able to inform the source eNB whether the RLF occurs during TTT or after TTT. However, if the RLF occurs after expiration of the TTT period, the source eNB cannot determine whether the RLF occurs while the UE is transmitting its measurement report or during the HO procedure (for example, before an HO command is sent to the UE).

Figure 6:
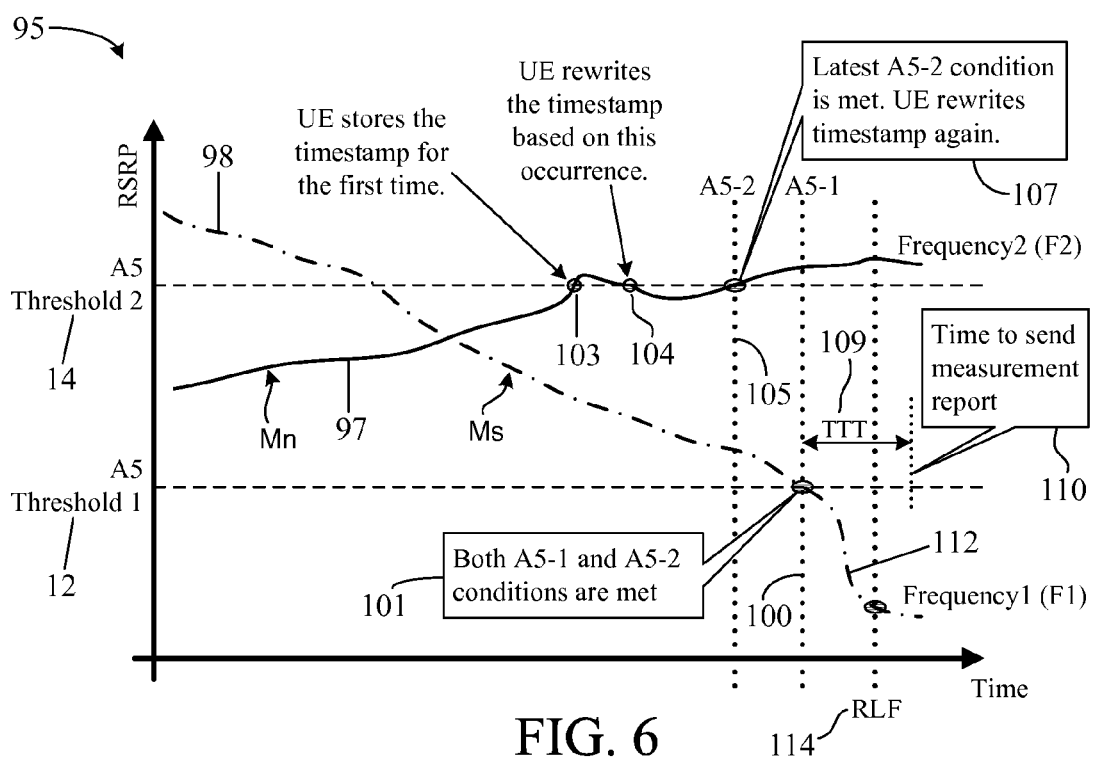
FIG. 6 illustrates an exemplary plot that shows how a UE may generate a time-stamp for only the latest fulfillment of an event-specific entering condition as per the teachings of one embodiment of the present disclosure.

Even though the timer-based method in the NSN document works to some extent to allow a source cell to analyze certain timing relationships between the event entering points and the RLF, the requirement that the UE start a timer whenever the UE enters a possible HO condition is a waste of UE processing resource because every possible HO condition may not result in an RLF. Starting a timer whenever a trigger event condition is met wastes UE's limited battery power because the UE may have to expend processing resources to keep running the timer which, in many cases, may produce no reportable result especially when the HO is successful. It is observed that nearly 99% of HO-triggering events terminate in a successful HO, hence, there is no point in keeping the timer(s) running. Furthermore, according to the NSN document, a timer starts when an event trigger condition happens and timer continues until RLF happens. However, while the timer is running, the event trigger condition may go above or below the threshold more than once (as shown in FIG. 6, which is discussed later below). It is unclear from the NSN document whether the timer is reset and restarted again every time an event condition is satisfied. Assuming the timer is able to reset and restart again, that approach would require additional processing on part of the UE, thereby further wasting the UE's battery power.

From the above discussion of HO-triggering associated with the LTE Event A5, it is seen that even though both the event-specific entering conditions A5-1 and A5-2 are met, and even though the HO procedure is triggered for a UE, it is still possible that an RLF may occur. Although the existing solutions enable the UE to produce an RLF report, that RLF report lacks critical timing information to assist the source cell to detect and analyze a non-threshold related cause of the RLF failure. The lack of such timing information may potentially lead to incorrect threshold settings for various Measurement Report-triggering events in LTE.

Figure 4:
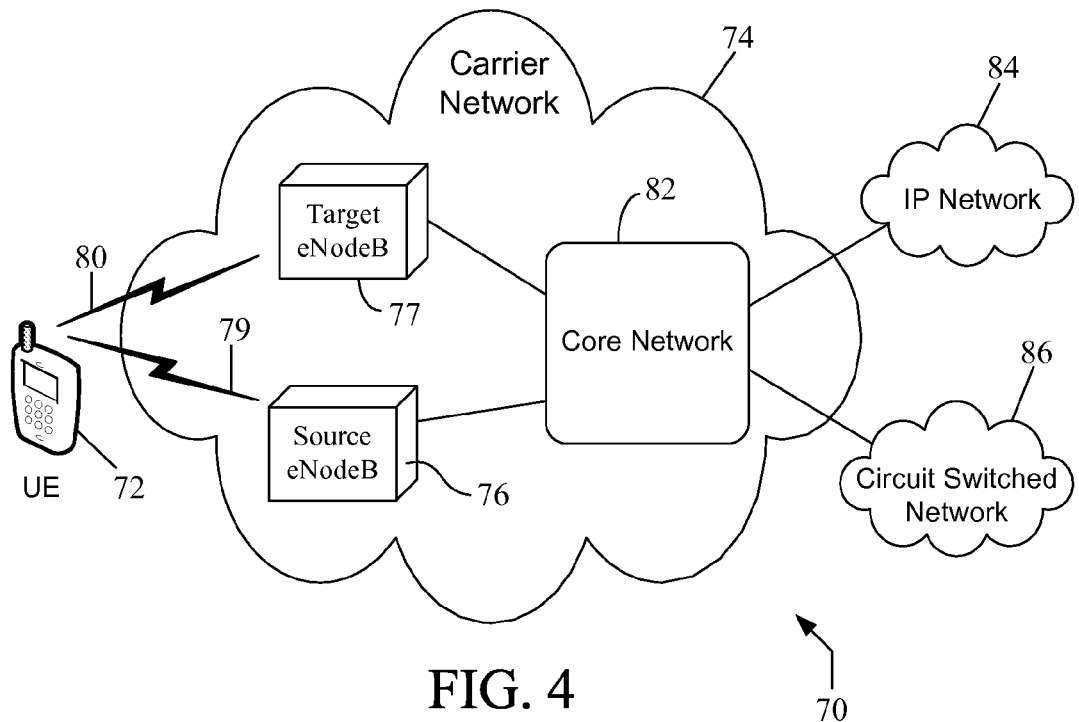
FIG. 4 depicts an exemplary wireless system in which the timestamp-based RLF reporting methodology shown in FIGS. 5-6 according to particular embodiments of the present disclosure may be implemented.
Figure 5:
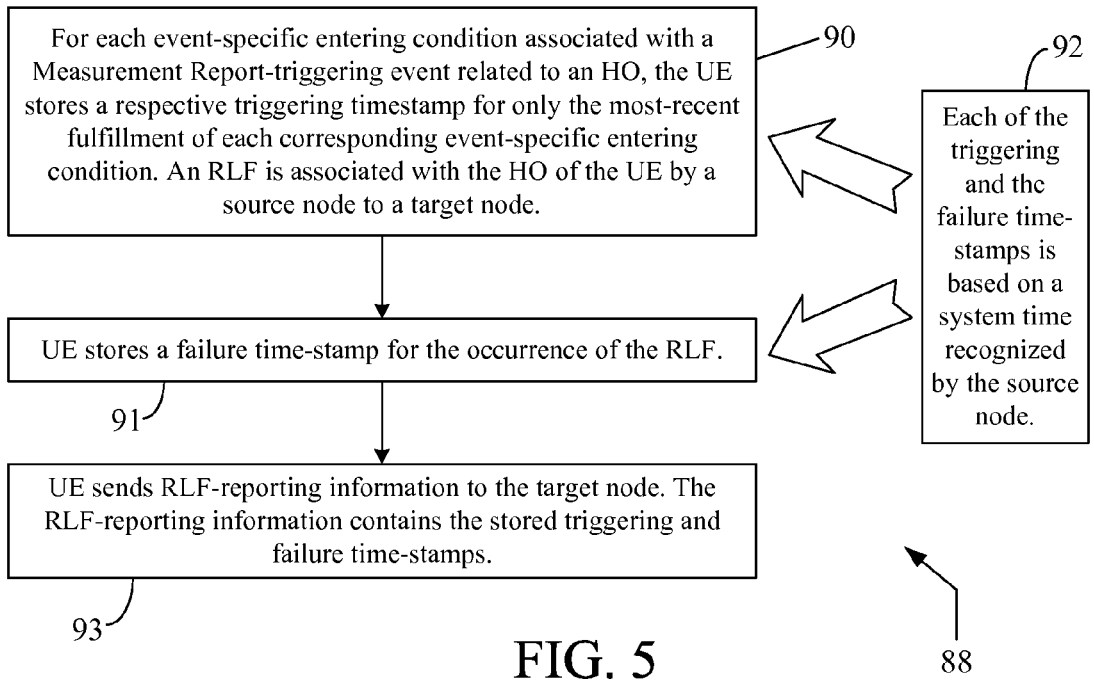
FIG. 5 is an exemplary flowchart depicting how a UE may generate an RLF report containing timestamp information as per the teachings of one embodiment of the present disclosure.

FIG. 4 depicts an exemplary wireless system 70 in which the timestamp-based RLF reporting methodology shown in FIGS. 5-6 according to particular embodiments of the present disclosure may be implemented. An exemplary wireless or mobile device 72 is shown as being operational in the system 70 through a mobile communication network 74. In the discussion herein, the terms "wireless network," "mobile communication network," "operator network," or "carrier network" may be used interchangeably to refer to a wireless communication network 74 that facilitates voice and/or data communication with different types of wireless devices, like the device 72. The carrier network 74 may be a cellular network, a proprietary data communication network, a corporate-wide wireless network, and the like.

In one embodiment, the wireless device 72 may be a UE or a Mobile Station (MS) capable of receiving/sending data content such as, for example, audio data as part of a voice call, audio-visual data as part of a video call, textual, graphical, and/or pictorial data associated with online gaming, and the like, from/to the network 74. In one embodiment, the wireless device or UE 72 may include an RLF reporting module such as, for example, the RLF report sender module 123 shown in FIG. 7 (discussed below), to provide timestamp-containing RLF reports according to the teachings of the present disclosure. The wireless device 72 may be referred to by such analogous terms as "mobile handset," "wireless handset," "mobile device," "mobile terminal," and the like. Some examples of UEs or mobile handsets/devices include cellular telephones or data transfer equipments, smartphones, handheld or laptop computers, Bluetooth® devices, electronic readers, portable electronic tablets, and the like. The data transfer equipment may include a Personal Digital Assistant (PDA) or a pager. The smartphones may include, for example, iPhones™, Android™ phones, Blackberry™ devices, and the like.

In the embodiment of FIG. 4, the carrier network 74 is shown to include two exemplary base stations (BS) or eNodeBs/eNBs 76-77. The UE 72 is shown to receive radio signals from each of these neighboring eNBs 76-77 via respective Radio Frequency (RF) links 79-80. It is noted here that when the wireless network 74 is a cellular LTE network, the eNB 76 may be associated with a particular cell—known as the "source cell"—and may provide RF coverage to the UE 72 as its source/serving eNB. The UE 72 may be served by the eNB 76 because it may be physically present, registered, associated with, for example, through RF coverage or prior handover, or operating within the eNB's source cell (not shown). The neighboring eNB 77 represents a potential "target" eNB to which the UE 72 may be handed over by the source eNB 76. For ease of drawing, various source and target "cells" are not shown in FIG. 4. As noted before, a "cell" and its associated base station such as, for example, an eNB (or eNodeB) may be referred to in an interchangeable manner. For example, a UE may be interchangeably referred to as being handed over to a target cell or a target eNB, or an HO may be interchangeably referred to as being initiated by a source cell or a source eNB, and so on.

As noted earlier, the term "source cell" generally refers to a PCell when there is no Carrier Aggregation (CA) present. For ease of discussion, only the non-CA scenario is assumed herein and, hence, the "source cell" (or "serving cell") 76 is treated as the PCell, without any discussion of Secondary Cells (SCells). Thus, a single frequency of operation is considered for the source cell 76. However, it is understood that the teachings of the present disclosure may equally apply to a CA-based cellular configuration as well.

Figure 8:
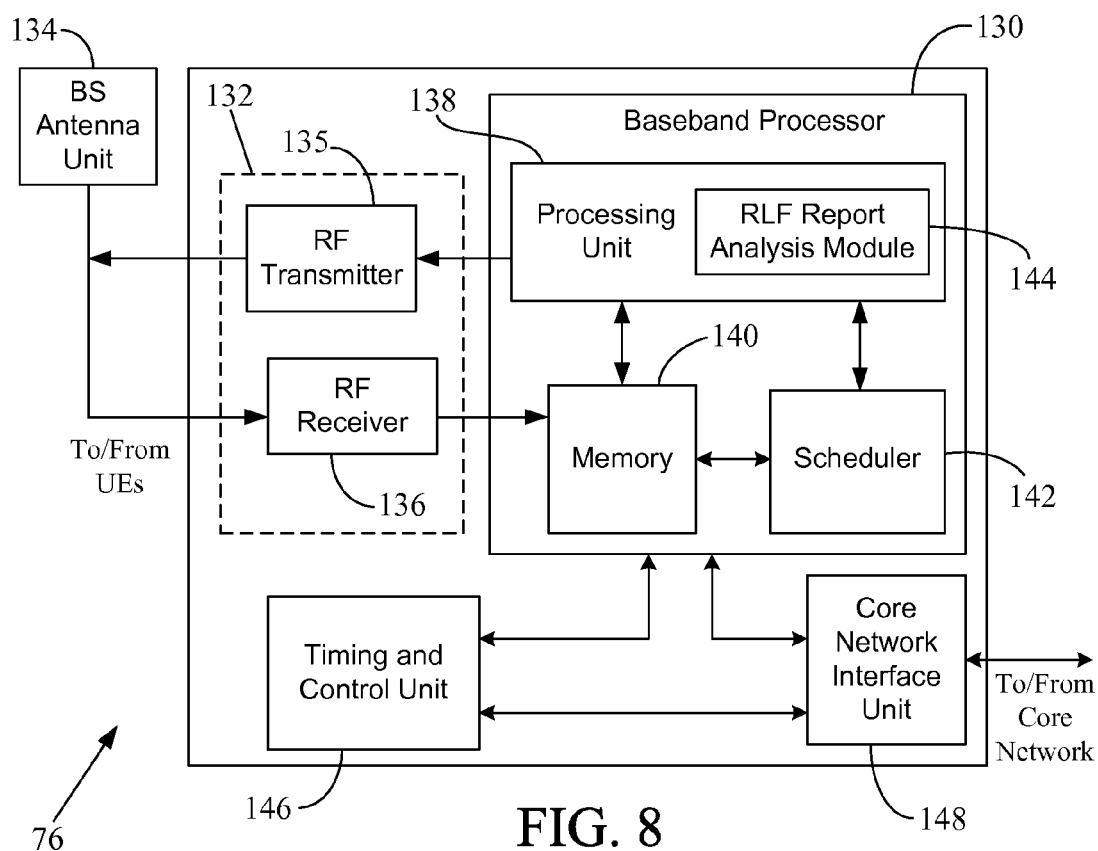
FIG. 8 depicts an exemplary block diagram of a base station that may function as a network entity according to one embodiment of the present disclosure.

The UE 72 is assumed to be "attached" to the source eNB 76—that is, the eNB 76 may be considered to be in "control" of the UE 72 and providing RF coverage to the UE 72 prior to its handover to the target cell 77. Thus, in the discussion herein, the eNB 76 may be considered as the eNB that was last serving the UE 72 immediately prior to the occurrence of an RLF and that is configured to process an RLF report received from the UE 72. In that regard, in one embodiment, the eNB 76 may include an RLF report analysis module 144 as shown in FIG. 8 (discussed below). It is noted that the other base station 77 may also perform as a "source eNB" for its respective UEs (not shown). For ease of illustration, both of the eNBs 76-77 in the embodiment of FIG. 4 are shown to be served and controlled by the same Core Network (CN) 82. It is understood that there may be additional core networks (not shown), either in the same operator's network 74 or in other carrier networks (not shown) in the wireless system 70. In that case, each of the eNBs 76-77 may be under operative control of a different core network. When the carrier network 74 is an LTE network, the eNBs 76-77 may be connected to each other through an "X2" interface, whereas each eNB 76-77 may be connected to the CN 82 via a respective "S1" interface.

The embodiment in FIG. 4 may be considered to represent a network configuration for an intra-LTE or intra-RAT handover scenario where an HO occurs within a Radio Access Network (RAN) and between RAN nodes of different vendors or between RAN nodes serving cells at different frequencies such as, for example, an inter-frequency HO between a macro cell (not shown) operating at frequency F1 and a small cell (not shown) operating at frequency F2. In one embodiment, the eNBs 76-77 may represent such RAN nodes for an intra-RAT HO. However, it is noted that the timestamp-based RLF-reporting methodology according to the teachings of the present disclosure may equally apply to handovers to inter-LTE or inter-RAT cells. For ease of illustration and simplicity of drawings, network configurations for such inter-RAT or inter-LTE handovers are not shown. In this context, it is pointed out that the target eNB 77 may represent an intra-LTE/intra-RAT neighbor cell to which the UE 72 may reconnect after an RLF during an HO procedure initiated at its source cell 76. Upon reconnection, the UE 72 may send its RLF report according to the teachings of the present disclosure to this target cell 77. However, in other embodiments, the UE 72 may reconnect to an inter-RAT cell (not shown) in another network (not shown) in the system 70 or in some other wireless system (not shown), or to some other intra-RAT cell (not shown) in the network 74 after an RLF, and send its RLF report to this "reconnected cell". Furthermore, in certain embodiments, the eNB 77 may not be the actual "target node" to which the source eNB 76 attempts to HO the UE 72, but may be the node to which the UE 72 reconnects after HO failure due to RLF. However, for ease of discussion here, any such "reconnected cell" or "reconnected node"—whether an intra-RAT cell or an inter-RAT cell—is generically referred to by the term "target cell" or "target node" and symbolically represented by the target cell/node 77 in FIG. 4, regardless of whether the UE 72 was to be handed over to the target eNB 77 by the source eNB 76.

As mentioned earlier, if an HO procedure fails for any reason, an RLF report may be generated by the UE 72 and the report may be then sent by the UE 72 to the "reconnected node" or "target node" after reconnection to a network, which may be the network 74 or some other network (not shown) as in case of an inter-RAT HO. The target/reconnected node may forward the UE's RLF report to the source cell that was serving the UE 72 immediately prior to the occurrence of the RLF. Hence, in the wireless network 70 of FIG. 4, the source eNodeB 76 may eventually receive the UE's RLF report and process the report as discussed below. In addition to providing air interface or communication channel to the UE 72, the BS 76 may also perform radio resource management using, for example, channel feedbacks received from the UE 72. The communication channel, for example, an RF channel (not shown), between the eNB 76 and the UE 72 may provide a conduit for the signals exchanged between the eNB 76 and UE 72. The base station 76 may provide radio interface—in the form of the RF link 79—to the device 72 via an antenna unit, and with or without the help of a secondary entity such as a pico or femto base station (not shown). The antenna unit is not shown in FIG. 4, but shown as the unit 134 in FIG. 8. Thus, terminals operating in a wireless network may exchange information with one another via a base station in the network over a communication channel or link between the base station and the wireless terminals. The wireless network 74 may be a dense network with a large number of wireless terminals operating therein. For ease of illustration, only one such device 72 is shown in FIG. 4. The carrier network 74 may support stationary as well as mobile devices. The mobile communication network 74 may be a cellular carrier network operated, managed, and/or owned by a wireless service provider (or operator).

In one embodiment, one or more of the base stations 76-77 may be base stations in a Third Generation (3G) network, or home base stations or femtocells, and may provide radio interface to respective mobile handsets attached thereto. In other embodiments, the base station may also include a site controller, an access point (AP), a Base Station Controller (BSC), a radio tower, or any other type of radio interface device capable of operating in a wireless environment.

Each base station (BS) 76-77 in FIG. 4 may be referred to as a "network entity," "access node" or "mobile communication node." In case of a 3G carrier network 74, the base stations 76-77 may include functionalities of a 3G RBS along with some or all functionalities of a 3G Radio Network Controller (RNC), and the BS 77 also may be configured to perform the RLF report-processing (when the BS 77 functions as a "source node" during an HO) discussed below with reference to BS 76 as an example. Communication nodes in other types of carrier networks such as, for example, Second Generation (2G) or Fourth Generation (4G) networks, and beyond, also may be configured similarly. In the embodiment of FIG. 4, the node 76 may be configured (in hardware, via software, or both) to implement the RLF report-processing as per teachings of the present disclosure. For example, when existing hardware architecture of the access node 76 cannot be modified, the handover methodology and subsequent RLF report-processing according to one embodiment of the present disclosure may be implemented through suitable programming of one or more processors in the access node 76 or a Base Station Controller (BSC) (if available). Such processor(s) may be, for example, the processor 130, or, more particularly, the processing unit 138 shown in FIG. 8. Upon execution of the program code by a processor in the node 76, the node 76 may be operative to perform various eNB-related functions such as, for example, triggering the UE 72 to send a Measurement Report, sending an HO command to the UE 72, processing of the received RLF report, and so on, as discussed later. Thus, in the discussion below, although the communication node 76 (or its BSC) may be referred to as "performing," "accomplishing," or "carrying out" a function or process, it is evident to one skilled in the art that such performance may be technically accomplished in hardware and/or software as desired.

Although the discussion herein primarily refers to a base station or an eNB as a "network entity," it is understood that in certain embodiments the term "network entity" may refer to, for example, a macro base station operating in conjunction with a secondary entity such as a pico or femto base station, a secondary entity such as a pico or femto base station, a group of base stations, an RNC, a Base Transceiver Station (BTS)—with or without the functionalities of a BSC, a core network, a BSC, or a combination of one or more base stations—with or without the functionalities of a BSC or an RNC—and a CN. For example, when certain RNC functionalities are implemented in a CN, the CN may represent the "network entity". If such RNC functionalities are distributed between a BS/eNB and a CN, then the "network entity" may be a combination of such a BS/eNB and the CN. On the other hand, in particular embodiments, a combination of multiple base stations or a single BS and some other node(s) (not shown) may constitute a "network entity". Another entity, which may be IP-based, in the network 74 or in the wireless system 70 other than those mentioned above may be configured to perform as a "network entity" as per the teachings of the present disclosure. Any of the network entities mentioned herein may "perform," "accomplish," or "carry out" a function or process using a suitably-configured hardware and/or software as desired.

The core network 82 in the carrier network 74 may be coupled to the base stations 76-77 and may provide logical and control functions such as, for example, terminal mobility management; access to external networks or communication entities; subscriber account management, billing, supporting the delivery of a subscriber-selected service such as a Voice over LTE (VoLTE) voice call service, and the like; Internet Protocol (IP) connectivity and interconnection to other networks (e.g., the Internet) or entities; roaming support; and so on.

In case of an LTE carrier network 74, the CN 82 may include some or all functionalities of an Access Gateway (AGW) or an Evolved Packet Core (EPC), or may function in conjunction with a subnet-specific gateway/control node (not shown). In certain embodiments, the CN 82 may be, for example, an International Mobile Telecommunications (IMT) CN such as a 3GPP CN. In other embodiments, the CN 82 may be, for example, another type of IMT CN such as a 3GPP2 CN (for Code Division Multiple Access (CDMA) based cellular systems), or an ETSI TISPAN (European Telecommunications Standards Institute TIPHON (Telecommunications and Internet Protocol Harmonization over Networks) and SPAN (Services and Protocols for Advanced Networks)) CN.

Regardless of the type of the carrier network 74, the core network 82 may function to provide connection of one or more of the UEs, like the UE 72, to their respective source/target eNBs and, through the eNBs, to other mobile handsets operating in the carrier network 74 and also to other communication devices or resources in other voice and/or data networks external to the carrier network 74. The communication devices may include wireline or wireless phones, whereas the resources may include an Internet website. The core network 82 may be coupled to a packet-switched network 84 such as, for example, an Internet Protocol (IP) network like the Internet as well as to a circuit-switched network 86 such as the Public-Switched Telephone Network (PSTN) to accomplish the desired connections for the UE 72 beyond the devices operating in the carrier network 74. Thus, through the source eNB's 76 connection to the core network 82 and the UE's 72 radio link 79 with the source eNB 76, a user of the UE 72 may wirelessly (and seamlessly) access many different resources or systems beyond those operating within the operator's network 74.

The carrier network 74 may be a cellular telephone network, a Public Land Mobile Network (PLMN), or a non-cellular wireless network which may be a voice network, data network, or both. As noted earlier, the carrier network 74 may include multiple cell sites (not shown). A wireless terminal, such as the UE 72, may be a subscriber unit in the carrier network 74. Furthermore, portions of the carrier network 74 may include, independently or in combination, any of the present or future wireline or wireless communication networks such as, for example, the PSTN, an IP Multimedia Subsystem (IMS) based network, or a satellite-based communication link. Similarly, as also mentioned above, the carrier network 74 may be connected to the Internet via its core network's 82 connection to the IP network 84 or may include a portion of the Internet as part thereof. In one embodiment, the operator network 74 or the wireless system 70 may include more or less or different types of functional entities than those shown in FIG. 4.

Although various examples in the discussion below are provided primarily in the context of an LTE network, the teachings of the present disclosure may equally apply, with suitable modifications as may be apparent to one skilled in the art using the present teachings, to a number of different Frequency Division Multiplex (FDM) or Time Division Multiplex (TDM) based wireless systems or networks—cellular or non-cellular—that may support handovers of mobile handsets through HO/measurement report trigger events and may require the mobile handsets to report radio link or other signal link failures during handovers. Such networks or systems may include, for example, standard-based systems/networks using Second Generation (2G), Third Generation (3G), or Fourth Generation (4G) specifications, or non-standard based systems. Some examples of such systems or networks include, but not limited to, Global System for Mobile communications (GSM) networks, Telecommunications Industry Association/Electronic Industries Alliance (TIA/EIA) Interim Standard-136 (IS-136) based Time Division Multiple Access (TDMA) systems, Wideband Code Division Multiple Access (WCDMA) systems, 3GPP LTE networks, WCDMA-based High Speed Packet Access (HSPA) systems, 3GPP2's CDMA based High Rate Packet Data (HRPD) systems, CDMA2000 or TIA/EIA IS-2000 systems, Evolution-Data Optimized (EV-DO) systems, Worldwide Interoperability for Microwave Access (WiMAX) systems based on Institute of Electrical and Electronics Engineers (IEEE) standard IEEE 802.16e, International Mobile Telecommunications-Advanced (IMT-Advanced) systems such as LTE Advanced systems, other Universal Terrestrial Radio Access Networks (UTRAN) or Evolved-UTRAN (E-UTRAN) networks, GSM/Enhanced Data Rate for GSM Evolution (GSM/EDGE) systems, a non-standard based proprietary corporate wireless network, and so on.

FIG. 5 is an exemplary flowchart 88 depicting how a UE, such as the UE 72 in FIG. 4, may generate an RLF report containing timestamp information as per the teachings of one embodiment of the present disclosure. It is noted here that the term "RLF report" is used in a generic sense in conjunction with discussion of FIGS. 4-8. In other words, the term "RLF report" generally refers to "RLF-reporting information" generated by a UE, such as the UE 72, as per the teachings of the present disclosure. As discussed below, in one embodiment, such "RLF-reporting information" may include, among other things, various timestamps related to the fulfillment of one or more entering conditions of an HO-triggering event as well as a timestamp related to the occurrence of the RLF. As pointed out earlier, for ease of discussion, the terms "HO-triggering event," "Measurement Report-triggering event," and "trigger event" are used interchangeably herein to refer to an "event" such as, for example, the Event A5 or the Event B2 defined for E-UTRAN, that triggers a UE to generate a Measurement Report as part of an HO procedure.

It is indicated at block 90 in FIG. 5 that, for each event-specific entering condition associated with a Measurement Report-triggering event related to a handover (HO), a UE, such as the UE 72, may store a respective triggering timestamp for only the most recent fulfillment of each corresponding event-specific entering condition. An RLF is associated with the HO of the UE 72 by a source node, such as the source eNB 76, to a target node, such as the target eNB 77. As mentioned earlier, the source eNB 76 was serving the UE 72 immediately prior to the occurrence of the RLF. For a dual-threshold HO-triggering event such as, for example, the Event A5, the UE 72 would record two triggering timestamps—a first triggering timestamp for the latest fulfillment of the A5-1 condition, and a second triggering timestamp for the latest fulfillment of the A5-2 condition. In case of a single-threshold HO-triggering event such as, for example, the Event A3 mentioned below, the UE 72 may record a single triggering timestamp for the latest fulfillment of the event-specific "entering condition." The term "latest" here refers to the most-recent occurrence of an "entering condition" for an HO-triggering event as shown in FIG. 6 and discussed in more detail below.

At block 91, the UE 72 may also store a failure time-stamp for the occurrence of the RLF. Along with the time-stamps at blocks 90-91, in one embodiment, the UE 72 may also store the signal strength of the source eNB 76 when the RLF occurs. As indicated at block 92, in one embodiment, all of the time-stamps recorded by the UE 72 at blocks 90-91 may be based on a reference time recognized by the source node 76. More details about such "reference time" or "system time" are provided later below.

In one embodiment, in case of a multiple-threshold HO-triggering event, such as, for example, the dual-threshold Event A5, the UE 72 may not generate and store time-stamps for the most recent fulfillment of each corresponding event-specific entering condition as indicated at block 90. Rather, the UE 72 may store a system time-based triggering time-stamp for only the most recent fulfillment of one of the plurality of event-specific entering conditions. For example, the timing instance when the first threshold requirement from the plurality of threshold requirements is met can be recorded in the form of a triggering time-stamp. The timing indication for the latest fulfillment of the second threshold requirement, which is met next in sequence, may be recorded in the form of a time duration/period value measured from the timing instance of the triggering time-stamp for the first threshold requirement. Similarly, a respective time duration value—as measured with reference to the triggering time-stamp of the first threshold requirement—may be stored as a timing indication for the latest fulfillment of the threshold condition that is met third in sequence, and so on for each subsequently-realized threshold condition.

At block 93, the UE 72 may send RLF-reporting information (also referred to herein by the more generic term "RLF Report" as mentioned earlier) to the target node 77. As mentioned earlier, when the UE 72 reconnects to the network 74 after the RLF, the UE 72 may send its RLF report to the target cell 77, which will then forward that RLF report to the source cell 76. The RLF-reporting information may include the triggering and failure time-stamps stored by the UE 72 at blocks 90-91. In one embodiment, the RLF-reporting information also may include the stored value of the signal strength of the source eNB 76 when the RLF occurs. In the embodiment where a single triggering time-stamp is stored along with one or more time duration values as "timing indications" related to corresponding event-specific entering conditions, the RLF Report at block 93 may include all such timing indications along with the failure time-stamp.

The timing information or timestamps according to particular embodiments of the present disclosure may be included in the currently-defined UEInformationResponse message along with other already-defined information to be sent by the UE 72 upon occurrence of an RLF. For example, in one embodiment, the "rlf-Report" Information Element (IE) of the currently-defined UEInformationResponse message may be modified to contain the RLF-reporting information (or "RLF Report") as per the teachings of the present disclosure. In another embodiment, when the timestamp-based RLF-reporting information is not contained in the modified rlf-Report IE, the currently-defined format of the UEInformationResponse message may be modified to include the RLF-reporting information elsewhere in the message. As noted before, sections 5.6.5 and 6.2.2 in the earlier-mentioned 3GPP TS 36.331 provide the currently-defined format of the UEInformationResponse message. In yet another embodiment, the RLF-reporting information according to the teachings of the present disclosure may be sent using a modified version of some other existing RRC message or using a newly-defined message.

As mentioned before, the "reference time" associated with a time-stamp—whether a triggering time-stamp at block 90 or a failure time-stamp at block 91 in FIG. 5—can be a system time of the source eNB 76, a network-wide common time available throughout the carrier network 74, a time in the Global Navigation Satellite System (GNSS) format, or any other absolute time that is common between the UE 72 and the source cell 76. For ease of discussion, the terms "system time" and "reference time" may be used interchangeably herein to essentially refer to the timing reference used by the UE 72 to record various time-stamps discussed herein and recognized by the UE's source cell 76 during processing of such timestamp-related timing information.

There are different ways for a UE to "know" the "system time" of its source cell. In one embodiment, the UE 72 may be made aware of the source eNB's 76 timing reference when the UE 72 receives a System Information (SI) message from the source cell 76, for example, during its attachment-related signaling exchange with the source cell 76 or during some other system acquisition procedure in the network 74, as discussed, for example, in sections 5.2.2 and 6.3 of the earlier-mentioned 3GPP TS 36.331. For example, if the UE 72 is LTE- as well as CDMA-capable and if the carrier network 74 is a CDMA network, then a System Information Block Type 8 (SIB8) message from the CDMA source cell 76 may include the system time of the CDMA network 74. The UE 72 may have been handed over to this new CDMA source cell 76 during an inter-RAT HO from a previous LTE network. Upon receiving the SIB8 message, the UE 72 can synchronize its previous LTE timing with the new CDMA system time. Therefore, if an RLF occurs later during the source cell's 76 HO attempt, the time-stamp based timing information from the UE 72 would be based on the CDMA system time recognized by the CDMA source cell 76. As another example, in case of an E-UTRAN network, the RRC messaging may provide a UE with a common reference source of time. For example, if the source cell 76 is part of the E-UTRAN network, the source cell 76 may provide the UE 72 with information about the absolute time in the current cell 76. For instance, the earlier-mentioned UEInformationResponse message may contain an "absoluteTimeInfo" IE, which indicates the UE's awareness of the absolute time in the current cell. The UE 72 may use this absolute time information when generating the time-stamps at blocks 90-91 (FIG. 5) so as to base the timestamps on the absolute system time.

Furthermore, the "locationInfo" IE in the UEInformationResponse message may contain the "gnss-TOD-msec" field representing the Time of Day (TOD) in the GNSS format. The UEInformationResponse message—which may include the RLF report according to the teachings of the present disclosure as well as the "gnss-TOD-msec" field—may be reported by the source cell 76 to the network operator's Operations, Administration and Management (OAM) system (not shown) via Minimization of Drive Tests (MDT) traces. Thus, the OAM can compare the absolute timestamps captured in the UE's RLF report with its own global timing reference such as, for example, a timing reference based on the GNSS format reported in the "gnss-TOD-msec" field. Also, the reference time-based failure timestamp generated at block 91 (FIG. 5) may enable the OAM to record exactly when an RLF occurs because the failure timestamp clearly indicates when in the day the RLF occurs. The timestamp-based information according to the teachings of the present disclosure can be useful for traffic/network analysis by the OAM. Some examples of such analysis include determination of radio link overload causing RLF, determination of local interference causing RLF, and/or determination of other possible causes.

When the source eNB 76 receives the RLF report sent by the UE 72, the source eNB 76 may analyze/process the received RLF-reporting information and, based on the analysis of the new timestamp-based timing information in the RLF report, the source eNB 76 may determine one or more of the following:

(a) For a dual-threshold event such as, for example, the Event A5, the timing instances when each event-specific "entering condition" is most-recently fulfilled with reference to the system time. Similar information may be determined for a single threshold event as well, such as, for example, the Event A3 described below.

(b) The time duration between the two time instances representing the latest fulfillments of respective "entering conditions" of the dual-threshold event. For the exemplary Event A5, this represents the time period between the most recent fulfillments of the A5-1 and A5-2 conditions.

(c) The time instance of the occurrence of the RLF with reference to the system time, and how soon the RLF occurs after both event-specific entering conditions are fulfilled for the dual-threshold event or after the event-specific entering condition is fulfilled for the single-threshold event. In case of Event A5, this refers to how soon the RLF occurs after both A5-1 and A5-2 conditions are fulfilled.

(d) Whether the currently-configured TTT duration is "too long" so that the source cell signal drops too much before TTT expires.

(e) Whether the source cell's signal strength drops too fast after a UE sends its measurement report, so that the UE is not able to receive the HO command due to weak signal from the source cell.

(f) Whether the RLF is due to TTT timer length or the UE not being able to receive the HO command after sending its Measurement Report.

Triggering an HO is a matter of timing. With the timestamp-based better picture about why RLF happens, the source cell can provide a better resolution to address the root cause of the RLF. Thus, instead of limiting the solution to the adjustment of one or more threshold levels, the source cell can also adjust TTT interval or other cell coverage related parameters depending on the root cause of the RLF. Furthermore, in contrast to the earlier-discussed NSN document, the timestamping approach according to the teaching of the present disclosure does not need any decision logic as to whether a timer should be started or to be reported, such as, for example, when one of the event trigger is not fulfilled. The timestamping approach can be used in all cases, even when one of the event-specific entering conditions is not fulfilled when RLF occurs.

FIG. 6 illustrates an exemplary plot 95 that shows how a UE such as, for example, the UE 72 in FIG. 4, may generate a time-stamp for only the latest fulfillment of an event-specific entering condition as per the teachings of one embodiment of the present disclosure. For ease of reference and continuity of discussion, FIG. 6 illustrates an RLF related to the previously-discussed condition (3) of the "too late HO" case for Event A5. As mentioned earlier, the condition (3) of the "too late HO" case relates to a situation where RLF occurs when both threshold criteria—A5-1 and A5-2—are met, but an HO has not been triggered, for example, because the TTT has not expired, or the HO procedure has already started but has not finished yet.

Prior to discussing FIG. 6, it is pointed out here that the Event A5 and the "too late HO" case are simply used as examples in FIG. 6. The teachings of the present disclosure are also applicable to other "events" and other mobility failure cases associated with an RLF due to HO. Such other mobility failure cases include, for example, the earlier-described "too early HO" and "HO to wrong cell" cases.

Thus, in one embodiment, the UE 72 may send a Measurement Report prior to the occurrence of the RLF (as shown, for example, in FIG. 3), and then send the RLF report as per the teachings of the present disclosure without receiving an HO command from its source node 76 or after receiving an HO command from the source eNB 76, but before the HO is completed. The other "events" may include E-UTRAN events or non-EUTRAN events, regardless of whether the event is a single-frequency threshold event (such as the events A3 and A6), a dual-frequency threshold event (such as the events A5 and B2), or an event having more than two threshold "entering conditions." For example, the teachings of the present disclosure may apply to various "events" defined for E-UTRAN in section 5.5.4 of the earlier-mentioned 3GPP TS 36.331. Some examples of these "events" include: (i) An "A3" event, which refers to a situation when the UE 72 is receiving signals from a target cell such as, for example, the target cell 77, that are better than the signals from its serving cell 76 by a predefined offset. (ii) An "A1" event in which the signals from the serving cell 76 become better than a pre-defined threshold. (iii) An "A2" event in which the signals from the serving cell 76 become worse than another pre-defined threshold. (iv) A "B2" event, which defines a situation when the signals from a UE's serving cell 76 become worse than a first pre-defined threshold and signals from an inter-RAT neighbor cell (not shown in FIG. 4) become better than a second pre-defined threshold. (v) An "A6" event in which the signals from a neighbor cell become better than a Secondary Cell (SCell) by a pre-defined offset in a system having Carrier Aggregation (CA).

Referring now to FIG. 6, for ease of reference, the A5-1 and A5-2 thresholds are indicated using the same reference numerals 12 and 14, respectively, as in FIG. 1. However, in FIG. 6, two new exemplary RSRP signal strength plots 97-98 for Mn and Ms, respectively, are shown. It is noted in FIG. 6 that Ms signal plot 98 is associated with operational frequency "F1" whereas the Mn signal plot 97 is associated with operational frequency "F2," thereby representing a dual-frequency threshold scenario of Event A5. However, as mentioned before, the teachings of the present disclosure apply to a single-frequency threshold event as well. It is observed that during an HO process, one or both event-specific entering conditions—here, A5-1 and A5-2 in case of FIG. 6—may go above or below the corresponding threshold more than once. For example, in FIG. 6, the Mn plot 97 is shown to satisfy the A5-2 threshold three times before both the A5-1 and A5-2 conditions are met at the timing instance 100 as indicated by the text block 101. These three occurrences of fulfillment of the A5-2 condition are pointed out using reference numerals 103-105 in FIG. 6. Although not shown in FIG. 6, instead of or in addition to the A5-2 condition, the A5-1 condition may be similarly fulfilled multiple times prior to the instance 100. As discussed with reference to FIG. 5, the UE 72 may record a time-stamp for only the most-recent fulfillment of an event-specific entering condition. Thus, as shown in FIG. 6, although the UE 72 may generate and store a time-stamp at timing instance 103 when the Mn plot 97 first meets the A5-2 condition, the UE 72 may overwrite that time-stamp with the time-stamp for the timing instance 104 when the Mn plot 97 again meets the A5-2 condition. The UE 72 may again rewrite the timestamp for the previous timing instance 104 when the Mn plot 97 against satisfies the A5-2 condition at the timing instance 105, as noted at text block 107. Thus, according to one embodiment, whenever the UE 72 generates a new time-stamp, the UE 72 may overwrite the time-wise preceding time-stamp, so as to retain only the most-recent time-stamp. In other words, the overwriting process results in the storage of the time-stamp for only the most-recent fulfillment of an event-specific entering condition.

In FIG. 6, an exemplary TTT time interval 109 is shown and its associated block 110 points out that the UE may send its Measurement Report at the conclusion of this defined TTT period. The TTT period 109 may be configured by the source eNB 76. Like FIG. 2, it is shown in FIG. 6 that there is a steep drop in the signaling strength of Ms immediately after the A5-1 condition is met. This sharp signal drop is indicated by reference numeral "112." The sharp signal drop of signals from the source eNB 76 may cause the UE 72 to experience an RLF. The timing instance of the occurrence of this RLF is indicated by the reference numeral "114." Additional discussion of certain features of the "too long TTT" scenario in FIG. 6 is not provided in view of the earlier discussion of similar features with reference to FIG. 2.

Figure 7:
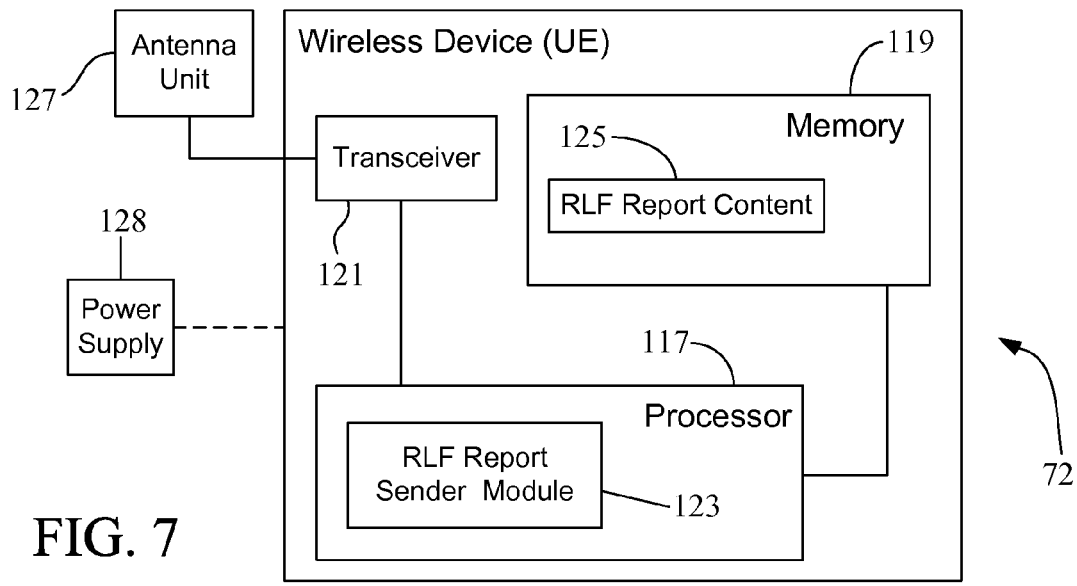
FIG. 7 shows a block diagram of an exemplary wireless device according to one embodiment of the present disclosure.

FIG. 7 shows a block diagram of an exemplary wireless device 72 according to one embodiment of the present disclosure. As noted earlier, the mobile or wireless device 72 may be a UE, an Access Terminal (AT), or any other wireless device operating in a carrier network such as, for example, the network 74 in FIG. 4. The wireless device 72 may include a processor 117, a memory 119, and a transceiver 121. In some embodiments, the memory 119 may also include memory on the UE's Subscriber Identity Module (SIM) card. The processor 117 may include an RLF Report Sender Module (RSM) 123, which may include program code for preparing and sending an RLF report (or RLF-reporting information) to a network entity such as, for example, the target eNB 77 in the carrier network 74 as per the teachings of one embodiment of the present disclosure. Upon execution of the program code of the RSM 123 by the processor 117, the processor may configure the wireless device 72 to perform various RLF reporting tasks discussed hereinbefore with reference to FIGS. 5-6. Such tasks include, for example, generation and storage of time-stamps for the latest fulfillment of various event-specific entering conditions, generation and storage of a timestamp for the occurrence of an RLF, sending the RLF-reporting information even when there is no HO command received from the source node 76 or sending the RLF report after receiving an HO command, and so on.

The memory 119 may store the information to be sent as part of the RLF report as shown, for example, by the block labeled "RLF Report Content" 125 in FIG. 7. For example, in one embodiment, the RLF Report Content 125 may include the time-stamps associated with the latest fulfillment(s) of event-specific entering condition(s), the failure timestamp associated with the RLF, the signal strength of the source cell 76 when the RLF occurs, and such other information that the UE 72 may send as part of reporting an RLF using the earlier-mentioned UEInformationResponse message.

The transceiver 121 may communicate with the processor 117 to perform transmission/reception of data, control, or other signaling information—via an antenna unit 127—to/from the network entity with which the wireless device 72 may be in communication. The transceiver 121 may be a single unit or may comprise of two separate units—a transmitter (not shown) and a receiver (not shown). The antenna unit 127 may include one or more antennas and, in some embodiments, may enable the UE 72 to operate in a Carrier Aggregation environment. Alternative embodiments of the wireless device 72 may include additional components responsible for providing additional functionality, including any of the functionality identified herein, such as, for example, attaching to its source cell 76, preparing and sending a Measurement Report as part of an HO procedure triggered by its source cell 76, sending the RLF-reporting information as discussed before with reference to FIGS. 5-6, and so on, and/or any functionality necessary to support the solution as per the teachings of the present disclosure. For example, in one embodiment, the wireless device 72 may be a multi-mode device capable of operating in LTE and non-LTE networks. In another embodiment, the wireless device 72 may include an on-board power supply unit 128 such as, for example, a battery or other source of power, to allow the device to be operable in a mobile manner.

In one embodiment, the wireless device 72 may be configured—in hardware, via software, or both—to implement device-specific aspects of timestamp-based RLF report generation and transmission as per teachings of the present disclosure. The software or program code may be part of the RSM 123 and may be stored in the memory 119 and executable by the processor 117. For example, when existing hardware architecture of the device 72 cannot be modified, the functionality desired of the device 72 may be obtained through suitable programming of the processor 117 using the RSM 123. The execution of the program code, by the processor 117, may cause the device 72 to perform as needed to support the time-stamping based solution as per the teachings of the present disclosure. Thus, although the wireless device 72 may be referred to as "performing," "accomplishing," or "carrying out" (or similar such other terms) a function or a process or a method step, such performance may be technically accomplished in hardware and/or software as desired. The network operator or a third party, such as, for example, a manufacturer or supplier of the device 72, may suitably configure the device 72, for example, through hardware and/or software based configuration of the processor 117, to operate and reciprocate with the network entity, such as the eNBs 76-77 in FIG. 4, as per the particular requirements of the present disclosure discussed above.

FIG. 8 depicts an exemplary block diagram of a base station, such as the source eNB 76 in FIG. 4, that may function as a network entity according to one embodiment of the present disclosure. In one embodiment, the base station 76 may be configured to perform various functionalities of the network entity discussed earlier with reference to FIGS. 5-6. Thus, for example, the base station 76 may be configured to trigger the UE 72 to perform neighboring cell measurements and send a Measurement Report, send an HO command to the UE 72, perform the HO of the UE 72 to the target eNB 77, receive an RLF report sent by the UE 72 and analyze the time-stamps contained therein to determine the root cause of the RLF and adjust the TTT duration or some other parameter to address the root cause, and so on. The base station 76 may or may not use a secondary entity such as, for example, the pico base station, to perform some or all of such tasks.

The base station 76 may include a baseband processor 130 to provide radio interface with the wireless device 72 via base station's Radio Frequency (RF) transceiver unit 132 coupled to the base station's antenna unit 134. The antenna unit 134 may include one or more antennas (not shown) and, in certain embodiments, the base station 76 may support Carrier Aggregation. The transceiver unit 132 may include RF transmitter 135 and RF receiver 136 units coupled to the antenna unit 134 as shown. In one embodiment, the processor 130 may receive transmissions from the wireless device 72 via the combination of the antenna unit 134 and the receiver 134. Such transmissions may include, for example, uplink and/or downlink channel condition related information, geographical location information, requests for multimedia content, HO-related Measurement Reports, timestamp-based RLF-reporting information, and the like. The base station's transmissions to the wireless device 72 may be carried out via the combination of the antenna unit 134 and the transmitter 135. Such BS-originated transmissions include, for example, streaming of multimedia content, a query for a mobile device's geographical location information, scheduling-related messages, HO triggers/commands, and the like.

The processor 130 may be configured (in hardware and/or software) to perform various actions mentioned above as well as discussed with reference to FIGS. 5-6 as being performed by the source eNB 76. In that regard, the processor 130 may include a processing unit 138 coupled to a memory 140 and a scheduler 142 to enable the processor 130 to perform such actions discussed in detail hereinbefore. In one embodiment, the memory 140 may be a separate unit—that is, not an internal part of the processor 130 as in FIG. 8—but coupled to the processor 130 to provide requisite storage. In another embodiment, the memory 140 may function as a storage of RLF-reporting information and other content such as, for example, a Measurement Report, received from the UE 72. The memory 140 may also contain program code that, upon execution by the processing unit 138, may configure the eNB 76 to perform analysis/processing of a timestamp-based RLF report as discussed hereinbefore with reference to FIGS. 5-6. In that regard, the processing unit 138 may include an RLF Report Analysis Module 144 that may contain program code. In one embodiment, the program code in the analysis module 144, when executed in conjunction with the program code in the memory 140, may configure the eNB 76 to perform the RLF report analysis according to particular embodiments of the present disclosure. For example, through the analysis module 144, the processing unit 138 may execute appropriate program code to receive and process an RLF report sent by the UE 72, determine the root cause of the RLF based on the timestamps in the RLF report, adjust appropriate parameters or take appropriate remedial actions to address the root cause, report RLF-related failure information to the operator's OAM, and the like.

The processing unit 138 may be in communication with the memory 140 to process and store relevant information for the corresponding cell site such as, for example, the identities of the UEs or wireless devices operating within the source cell, channel condition reports received from wireless devices, HO-related Measurement Reports received from UEs, timestamp-based RLF reports received from the UEs and results of the analysis of such RLF reports, and so on.

A scheduler, such as the scheduler 142 in FIG. 8, may be part of the base station's processor 130 and may provide the Uplink (UL) and Downlink (DL) scheduling decisions for the wireless device 72 based on a number of factors such as, for example, QoS (Quality of Service) parameters, device buffer status, UL and DL channel condition related information received from device, device capabilities, and the like. In one embodiment, the network entity 76 may include separate UL and DL schedulers (not shown in FIG. 8) as part of its baseband processor 130. The scheduler 142 may have the same data structure as a typical scheduler in an eNB in an LTE system. The processor 130 may also provide additional baseband signal processing as required. Such processing may include, for example, mobile/wireless device registration, channel signal information transmission, radio resource management, and the like. The processing unit 138 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. The processor 130 may employ distributed processing in certain embodiments.

Some or all of the functionalities described above and earlier with reference to FIGS. 4-6 as being provided by a network entity, such as a base station, a wireless access node/point, a base station controller, and/or any other type of mobile communications node, may be provided by the processing unit 138 executing instructions stored on a computer-readable data storage medium, such as the memory 140 shown in FIG. 8.

The network entity 76 in the embodiment of FIG. 8 may further include a timing and control unit 146 and a core network interface unit 148. The control unit 146 may monitor operations of the processor 130 and the network interface unit 148, and may provide appropriate timing and control signals to these units. The interface unit 148 may provide a bi-directional interface for the base station 76 to communicate with its core network or other network-based control entity to facilitate administrative and call/data-management functions for mobile subscribers operating in the corresponding cell site of the carrier network, such as the operator network 74 in FIG. 4.

Alternative embodiments of the base station 76 may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features and elements. Some or all aspects of the timestamp-based RLF reporting methodology provided herein may be implemented in a computer program, software, or firmware incorporated in a computer-readable storage medium, such as, for example, the memory 119 in FIG. 7 and/or the memory 140 in FIG. 8, for execution by a general purpose computer or a processor, such as, for example, the processor 117 in FIG. 7 and/or the processing unit 138 in FIG. 8. Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs). In certain embodiments, the memory 140 may employ distributed data storage with/without redundancy.

The foregoing describes a system and method in which an RLF report from a UE provides additional timing information to the source cell to enable the source cell to correctly analyze the real cause of an RLF associated with a handover. The additional timing information may be provided in the form of system time-based timestamps for the latest fulfillment of each event-specific entering condition associated with an HO-triggering event as well as for the occurrence of the RLF. Upon reconnection to a target node after the RLF, the UE may send the recorded timestamps as part of its RLF-reporting information to the target node. The target node then forwards this RLF-reporting information to the source node that was serving the UE immediately prior to the occurrence of the RLF. Such timing information assists the source cell to adjust event-specific threshold(s) as well as other non-threshold related HO parameters such as, for example, the TTT time period, the time delay between a UE's transmission of its Measurement Report and the source cell's transmission of the HO command, and so on, to reduce similar RLFs in the future. There is a minimal impact on UE's processing resources or battery power in generating the timestamp-based timing information.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of reporting an occurrence of a Radio Link Failure (RLF) associated with a handover (HO) of a User Equipment (UE) by a source node to a target node, wherein the method comprises performing the following by the UE:
   for each event-specific entering condition associated with a Measurement Report-triggering event related to the HO, storing a respective timing indication for only a most recent fulfillment of each corresponding event-specific entering condition;
   storing a failure time-stamp for the occurrence of the RLF; and
   sending RLF-reporting information to the target node, wherein the RLF-reporting information contains each stored timing indication and the stored failure time-stamp;
   wherein there is a plurality of event-specific entering conditions associated with the Measurement Report-triggering event, and wherein the UE performs the following as part of storing the respective timing indication:
      storing a triggering time-stamp for only the most recent fulfillment of a first one of the plurality of event-specific entering conditions, wherein the triggering time-stamp is based on a reference time recognized by the source node: and
      storing a respective time duration value for only the most recent fulfillment of each remaining event-specific entering condition in the plurality of event-specific entering conditions, wherein the respective time duration value is measured with reference to the triggering time-stamp; and
   wherein the reference time is one of the following:
      a system time of the source node;
      an absolute time used within a source cell associated with the source node:
      a network-wide common time available throughout a carrier network associated with the source node; or
      a time in a Global Navigation Satellite System (GNSS) format.

2. The method of claim 1, wherein there is a plurality of fulfillments of one or more event-specific entering conditions associated with the Measurement Report-triggering event, and wherein storing the respective triggering time-stamp includes performing the following by the UE:
   generating a corresponding time-stamp for each respective fulfillment in the plurality of fulfillments; and
   during the generating, overwriting each time-wise preceding time-stamp to thereby retain a triggering time-stamp for only the most recent fulfillment.

3. The method of claim 1, wherein the method comprises further performing the following by the UE:
    sending the Measurement Report to the source node prior to the occurrence of the RLF.

4. The method of claim 3, wherein sending the RLF-reporting information includes performing the following by the UE:
    sending the RLF-reporting information to the target node without receiving an HO command from the source node.

5. The method of claim 3, wherein sending the RLF-reporting information includes performing the following by the UE:
    sending the RLF-reporting information to the target node after receiving an HO command from the source node.

6. The method of claim 1, wherein the RLF-reporting information further contains the following:
    signal strength of the source node when the RLF occurs.

7. The method of claim 1, wherein sending the RLF-reporting information includes performing the following by the UE:
    sending the RLF-reporting information to the target node using one of the following:
        an rlf-Report Information Element (IE) in a UEInformationResponse message; and
        the UEInformationResponse message.

8. The method of claim 1, wherein the Measurement Report-triggering event is one of the following Evolved Universal Terrestrial Radio Access Network (E-UTRAN) events:
    an A3 event;
    an A5 event;
    an A6 event; and
    a B2 event.

9. A mobile device for reporting an occurrence of a Radio Link Failure (RLF) associated with a handover (HO) of the mobile device by a source node to a target node, wherein the source node serves the mobile device in a cellular network, and wherein the mobile device comprises:
    a transceiver for wirelessly communicating with the source node in the cellular network;
    a memory for storing program instructions; and
    a processor coupled to the memory and the transceiver and configured to execute the program instructions, whereby the mobile device is operative to:
        store the following in the memory for each event-specific entering condition associated with a Measurement Report-triggering event related to the HO:
            a respective timing indication for only a most recent fulfillment of each corresponding event-specific entering condition,
        further store, in the memory, a failure time-stamp for the occurrence of the RLF,
        wherein each of the respective timing indication and the failure time-stamp is based on a reference time recognized by the source node, and
        send RLF-reporting information to the target node, wherein the RLF-reporting information contains each stored timing indication and the stored failure time-stamp;
        wherein there is a plurality of event-specific entering conditions associated with the Measurement Report-triggering event, and wherein the mobile device is operative to perform the following as part of storing the respective timing indication:
            store, in the memory, a triggering time-stamp for only the most recent fulfillment of a first one of the plurality of event-specific entering conditions, wherein the triggering time-stamp is based on the reference time recognized by the source node; and
            store, in the memory, a respective time duration value for only the most recent fulfillment of each remaining event-specific entering condition in the plurality of event-specific entering conditions, wherein the respective time duration value is measured with reference to the triggering time-stamp; and
        wherein the reference time is one of the following:
            a system time of the source node;
            an absolute time used within a source cell associated with the source node;
            a network-wide common time available throughout a carrier network associated with the source node; or
            a time in a Global Navigation Satellite System (GNSS) format.

10. The mobile device of claim 9, wherein the mobile device is further operative to perform the following as part of storing the respective timing indication:
    store, in the memory, a respective triggering time-stamp for only the most recent fulfillment of each corresponding event-specific entering condition associated with the Measurement Report-triggering event, wherein the respective triggering time-stamp is based on the reference time recognized by the source node.

11. The mobile device of claim 10, wherein there is a plurality of fulfillments of one or more event-specific entering conditions associated with the Measurement Report-triggering event, and wherein the mobile device is operative to perform the following as part of storing the respective triggering time-stamp:
    generate a corresponding time-stamp for each respective fulfillment in the plurality of fulfillments; and
    during the generation, overwrite each time-wise preceding time-stamp so as to store a triggering time-stamp for only the most recent fulfillment.

12. The mobile device of claim 9, wherein the mobile device is operative to further perform the following:
    send the Measurement Report to the source node prior to the occurrence of the RLF.

13. The mobile device of claim 12, wherein the mobile device is operative to perform the following as part of sending the RLF-reporting information to the target node:
    send the RLF-reporting information to the target node without receiving an HO command from the source node.

14. The mobile device of claim 12, wherein the mobile device is operative to perform the following as part of sending the RLF-reporting information to the target node:
    send the RLF-reporting information to the target node after receiving an HO command from the source node.

15. A network entity in a cellular network for performing a handover (HO) of a mobile device to a target entity, wherein a Radio Link Failure (RLF) is associated with the HO and wherein the network entity was serving the mobile device immediately prior to the RLF, wherein the network entity comprises:
    a transceiver for wirelessly communicating with the mobile device;
    a memory for storing program instructions; and
    a processor coupled to the memory and the transceiver and configured to execute the program instructions, whereby the network entity is operative to:

receive RLF-reporting information from the target entity, wherein the RLF-reporting information contains the following:
   a respective triggering time-stamp for only a most recent fulfillment of each corresponding event-specific entering condition associated with a Measurement Report-triggering event related to the HO, and
   a failure time-stamp for the occurrence of the RLF, wherein each of the triggering and the failure time-stamps is based on a reference time recognized by the network entity, and
process the received RLF-reporting information; and
wherein the network entity is operative to perform one or more of the following as part of processing the received RLF-reporting information:
   when the Measurement Report-triggering event is a dual-threshold event, determine a time duration between the most recent fulfillments of two event-specific entering conditions associated with the dual-threshold event:

determine how soon the RLF occurs after all event-specific entering conditions are fulfilled for the Measurement Report-triggering event;
determine whether the RLF is due to an incorrectly-configured Time To Trigger (TTT) period;
determine whether the network entity's signal strength drops too fast after a Measurement Report is sent by the mobile device; and
determine whether the RLF is due to the mobile device not being able to receive an HO command from the network entity after sending the Measurement Report.

16. The network entity of claim 15, wherein the network entity is one of the following:
a Radio Base Station (RBS);
a Base Station Controller (BSC);
a Radio Network Controller (RNC); and
an evolved Node B (eNodeB).

* * * * *